(12) United States Patent
Bjerrum et al.

(10) Patent No.: US 6,946,211 B1
(45) Date of Patent: Sep. 20, 2005

(54) POLYMER ELECTROLYTE MEMBRANE FUEL CELLS

(75) Inventors: Niels Janniksen Bjerrum, Charlottenlund (DK); Qingfeng Li, Copenhagen (DK); Hans Aage Hjuler, Rungsted Kyst (DK)

(73) Assignee: Danish Power Systems APS, Charlottenlund (DK)

( * ) Notice: Subject to any disclaimer, the term of this patent is extended or adjusted under 35 U.S.C. 154(b) by 426 days.

(21) Appl. No.: 10/070,558

(22) PCT Filed: Sep. 8, 2000

(86) PCT No.: PCT/DK00/00495

§ 371 (c)(1),
(2), (4) Date: May 6, 2002

(87) PCT Pub. No.: WO01/18894

PCT Pub. Date: Mar. 15, 2001

(30) Foreign Application Priority Data

Sep. 9, 1999 (DK) ........................................ 1999 01274
Dec. 20, 1999 (DK) ........................................ 1999 01828

(51) Int. Cl.$^7$ ............................. H01M 8/10; H01M 6/00
(52) U.S. Cl. ............................. 429/33; 429/30; 429/41; 429/44; 429/46; 29/623.1; 29/623.5
(58) Field of Search ............................. 429/33, 30, 41, 429/44, 46; 29/623.1, 623.5

(56) References Cited

U.S. PATENT DOCUMENTS

| | | | |
|---|---|---|---|
| 4,814,399 A | 3/1989 | Sansone et al. | |
| 5,091,087 A | 2/1992 | Calundann et al. | |
| 5,525,436 A | 6/1996 | Savinell et al. | |
| 5,599,639 A | * 2/1997 | Sansone et al. | ............... 429/33 |
| 5,688,613 A | 11/1997 | Li et al. | |
| 5,716,727 A | 2/1998 | Savinell et al. | |

FOREIGN PATENT DOCUMENTS

| | | |
|---|---|---|
| DE | 197 21 952 A | 12/1998 |
| DE | 19721952 A1 * | 12/1998 ............ H01M/4/86 |

(Continued)

OTHER PUBLICATIONS

Performance Study of a Fuel Cell Pt–on–C Anode in Presence of CO and $CO_2$, and Calculation of Adsorption Parameters for CO Poisoning, by H. P. Dhar et al., Energy Research Corporation, vol. 133, No. 8, Aug. 1986, pp. 1574–1582.

(Continued)

*Primary Examiner*—Patrick Joseph Ryan
*Assistant Examiner*—Angela J. Martin
(74) *Attorney, Agent, or Firm*—Birch, Stewart, Kolasch & Birch, LLP

(57) ABSTRACT

A method for preparing polybenzimidazole or polybenzimidazole blend membranes and fabricating gas diffusion electrodes and membrane-electrode assemblies is provided for a high temperature polymer electrolyte membrane fuel cell. Blend polymer electrolyte membranes based on PBI and various thermoplastc polymers for high temperature polymer electrolyte fuel cells have also been developed. Miscible blends are used for solution casting of polymer membranes (solid electrolytes). High conductivity and enhanced mechanical strength were obtained for the blend polymer solid electrolytes. With the thermally resistant polymer, e.g., polybenzimidazole or a mixture of polybenzimidazole and other thermoplastics as binder, the carbon-supported noble metal catalyst is tape-cast onto a hydrophobic supporting substrate. When doped with an acid mixture, electrodes are assembled with an acid doped solid electrolyte membrane by hot-press. The fuel cell can operate at temperatures up to at least 200° C. with hydrogen-rich fuel containing high ratios of carbon monoxide such as 3 vol % carbon monoxide or more, compared to the carbon monoxide tolerance of 10–20 ppm level for Nafion®-based polymer electrolyte fuel cells.

36 Claims, 12 Drawing Sheets

FOREIGN PATENT DOCUMENTS

| | | | | |
|---|---|---|---|---|
| EP | 0557291 B1 * | 1/1994 | ............ | H01M/8/10 |
| EP | 0 577 291 B1 | 1/1994 | | |
| EP | 0 687 023 A | 12/1995 | | |
| EP | 0 869 568 A1 | 10/1998 | | |
| EP | 0869568 A1 * | 10/1998 | ............ | H01M/8/00 |
| WO | 99/04445 A1 | 1/1999 | | |
| WO | WO 99/04445 A1 * | 1/1999 | ............ | H01M/8/10 |

OTHER PUBLICATIONS

Nature of CO Adsorption during $H_2$ Oxidation in Relation to Modeling for CO Poisoning of a Fuel Cell Anode, by H.P. Dhar et al., Journal of Electrochemical Society, vol. 134, No. 12, Dec. 1987, pp. 3021–3026.

Acid–Doped Polybenzimidazoles: A New Polymer Electrolyte, by J.S. Wainwright, et al, Journal of Electrochemical Society, vol. 142, No. 7, Jul. 1995, pp. L121–L123.

Real–Time Mass Spectrometric Study of the Methanol Crossover in a Direct Methanol Fuel Cell, by J.-T. Wang et al., Journal of Electrochemical Society, vol. 143, No. 4, Apr. 1996, pp. 1233–1239.

Thermal Stability of Proton Conducting Acid Doped Polybenzimidazole in Simulated Fuel Cell Environments, by S.R. Samms et al., Journal of Electrochemical Society, vol. 143, No. 4, Apr. 1996, pp. 1225–1232.

Electro–osmotic Drag Coefficient of Water and Methanol in Polymer Electrolytes at Elevated Temperatures, by D. Weng et al., Journal of Electrochemical Society, vol. 143, No. 4, Apr. 1996, pp. 1260–1263.

Kinetics of $O_2$ Reduction on a Pt Electrode Covered with a Thin Film of Solid Polymer Electrolyte, by S.K. Zecevic et al., Journal of Electrochemical Society, vol. 144, No. 9, Sep. 1997, pp. 2973–2982.

Formic Acid Oxidation in a Polymer Electrolyte Fuel Cell, A Real–Time Mass–Spectrometry Study, by M. Weber et al., Journal of Electrochemical Society, vol. 143, No. 7, Apr. 1996, pp. L158–L160.

Acid–Doped Polybenzimidazole as the Membrane of Electrochemical Hydrogen Sensors, by R. Bouchet et al., Journal of Electrochemical Society, vol. 144, No. 5, May 1997, pp. L95–L97.

* cited by examiner

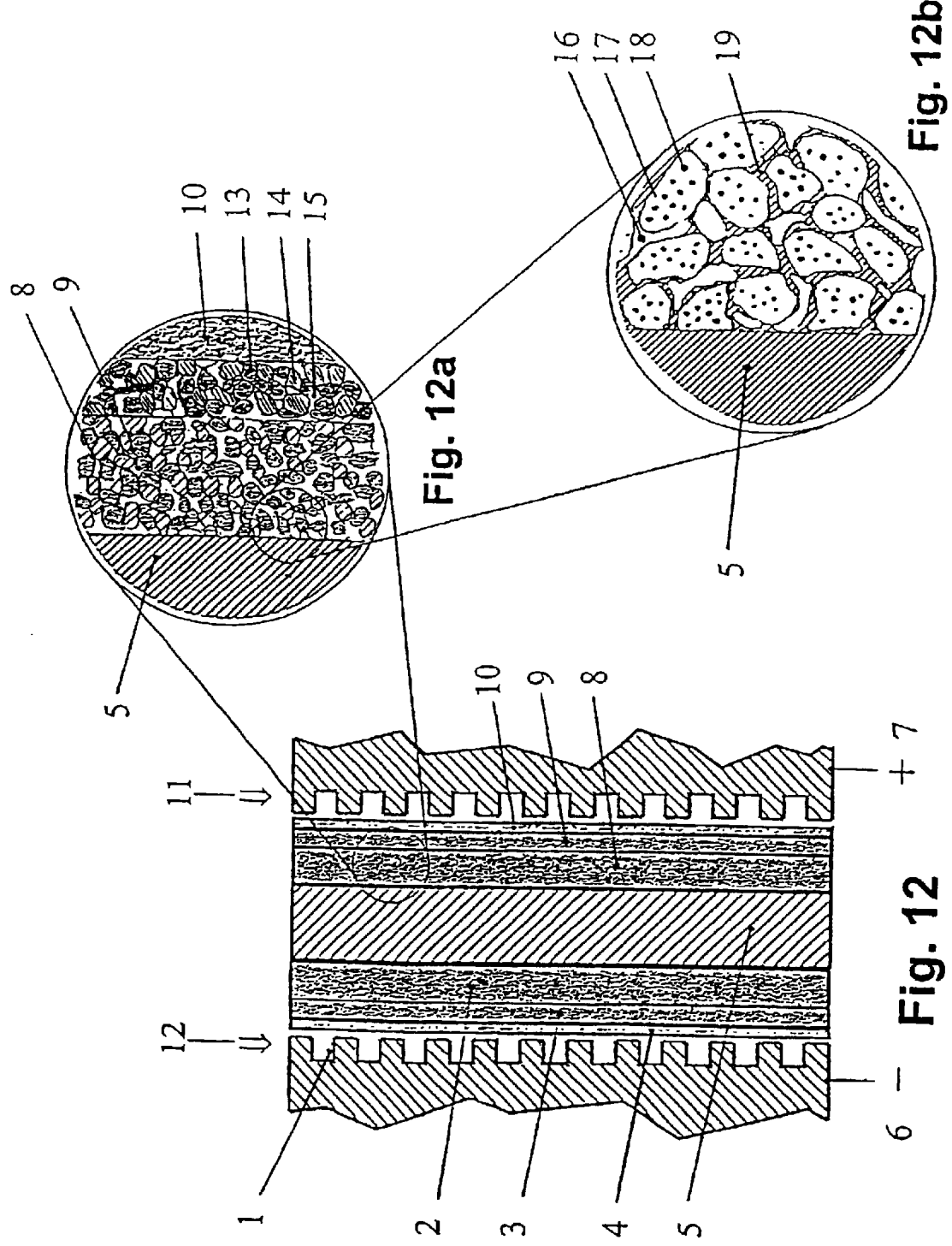

US 6,946,211 B1

POLYMER ELECTROLYTE MEMBRANE FUEL CELLS

This application is the national phase under 35 U.S.C. §371 of PCT International Application No. PCT/DK00/00495 which has an International filing date of Sep. 8, 2000, which designated the United States of America.

FIELD OF THE INVENTION

The present invention is directed to the field of polymer electrolyte membrane fuel cells, in particular to the preparation of gas diffusion electrodes and membrane-electrode assemblies for high temperature polymer electrolyte membrane fuel cells. The fuel cell according to the invention can operate at temperatures of up to at least 200° C. even with hydrogen fuel containing a relatively high amount of carbon monoxide, i.e. even 3 vol % carbon monoxide or more. The present invention also provides superior polymer electrolyte membranes based on blends of polybenzimidazole and thermoplastic polymers.

BACKGROUND OF THE INVENTION

In operation of a polymer electrolyte fuel cell, an oxygen-containing gas is fed to the cathode and a fuel-containing gas (e.g. hydrogen or methanol) to the anode. Hydrogen (or methanol) in the anode feed gas is then electrochemically oxidised by oxygen, forming water (and carbon dioxide) and generating electricity.

The currently well developed technology of polymer electrolyte membrane (PEM) fuel cells is based on perfluorosulfonic acid polymer membranes (e.g. Nafion®) as electrolyte. The conductivity of this polymer membrane is dependent on the presence of water to solvate the protons from the sulfonic acid groups. Consequently the operational temperature is limited to be below 100° C., typically 60–95° C., at atmospheric pressure. At higher temperatures, the conductivity is reduced dramatically since water is lost. By means of a pressurised system, the operational temperature can be extended but at the expense of overall system efficiency, size and weight. For an operation around 200° C., however, the pressure required will be too high to be of any practical use.

This is unfortunate because the use of a polymer electrolyte membrane at temperatures higher than 100° C. is desirable in several ways. The electrode kinetics will be enhanced and the catalytic activity will be increased at higher temperatures for both electrodes. Another benefit is the reduced poisoning effect of the catalysts by fuel impurities e.g. carbon monoxide, which have been known to be very temperature-dependent, since CO adsorption is less pronounced with increasing temperature. At 80° C., the typical operational temperature of a Nafion®-based polymer membrane electrolyte fuel cell, for example, the CO content as low as 20–50 ppm in the fuel steam will result in a significant loss in the cell performance. As a consequence very pure hydrogen is needed for operation of polymer electrolyte fuel cells.

For applications as a power system for automobiles, the direct usage of pure hydrogen eliminates the need to develop reliable on-board chemical processors; however, it faces other hurdles such as compact and light-weight fuel storage and network for fuel supply and distribution. Instead of pure hydrogen, liquid fuels such as methanol and gasoline/naphtha are the most favourable fuel for automobile applications. Methanol, among others, is for the time being produced in large quantities and is more easily reformed. Although the infrastructure for supply of methanol to the car fleet needs to be evaluated, it is believed that the development of a methanol infrastructure can be more easily obtained than a hydrogen infrastructure.

On-board processing of these high energy density fuels is also an attractive option to attain high vehicle range and short refueling time. For this purpose an on-board fuel processing system is necessary in order to convert the fuel into free hydrogen. During the on-board steam reforming carbon in the fuel is converted into carbon monoxide by oxidation with oxygen from the supplied steam, and hydrogen both from the fuel and from the steam is released as free hydrogen. The reformate gas contains therefore hydrogen, carbon dioxide, carbon monoxide, and the residual water as well as methanol. Due to the above-mentioned CO poisoning effect, further purification of the reformate gas is necessary in order to remove CO down to 10 ppm level. This is carried out by means of a water-gas shift reactor, followed by a preferential oxidiser and/or a membrane separator.

For a small dynamic load as in a vehicle, the main challenge for the on-board processing system is the complexity, which not only requires increased cost, size and volume, but also reduces the start-up time and transient response capacity of the system. Such a fuel processing system generally covers 40–50% cost of the fuel cell power stack. This can be decisively simplified by introducing a CO tolerant polymer electrolyte membrane fuel cell. Direct usage of methanol will be the ultimate option, since the dispensation with the complicated gas processors for reforming and CO removal is very much desired especially for automobile applications. However the technology is far from satisfactory. One of the major challenges is the anodic catalyst. Although Pt/Ru alloy is still recognised as the best, it is not sufficiently active, resulting in high anodic overpotential loss (ca. 350 mV compared to ca. 50 mV for hydrogen) and requiring high catalyst loading of the electrode (3–8 mg/cm$^2$). The insufficient activity of the anode catalyst is due to the slow kinetics of methanol oxidation and the strong poisoning effect of the intermediate species (CO) from methanol oxidation, both expected to be considerably improved by increasing the operational temperature of direct methanol fuel cells (DMFC).

The newest technology in the field is based on potybenzimidazoles (PBI, Celazole® from Hoechst Celanese). U.S. Pat. No. 5,091,087, for example, discloses a process for preparing a microporous PBI membrane. Being sulfonated (see U.S. Pat. No. 4,814,399), phosphonated (see U.S. Pat. No. 5,599,639) or doped with a strong acid (see U.S. Pat. No. 5,525,436 and Journal of Electrochemical society Vol.142 (1995), L21–L23), the polymer membrane becomes a proton conductor at temperatures up to 200° C. This polymer membrane can be used as electrolyte for PEM fuel cells with various types of fuels such as hydrogen, methanol, trimethoxymethane, and formic acid. U.S. Pat. 5,716,727 discloses another method for casting the polymer electrolyte membranes directly from an acid solution. It has been shown that this polymer electrolyte membrane exhibits high electrical conductivity (Journal of Electrochemical society Vol.142 (1995), L21–L23), low methanol crossover rate (Journal of Electrochemical Society, Vol.143 (1996), 1233–1239), excellent thermal stability (Journal of Electrochemical Society, Vol.143(1996), 1225–1232), nearly zero water drag coefficient (Journal of Electrochemical Society, Vol.143(1996), 1260–1263), and enhanced activity for oxygen reduction (Journal of Electrochemical Society, Vol.144 (1997), 2973–2982).

It has been suggested that this polymer membrane be used as electrolyte for fuel cells with various types of fuel such as hydrogen (Electrochemical Acta, Vol.41 (1996), 193–197), methanol (Journal of Applied Electrochemistry Vol.26 (1996), 751–756), trimethoxymethane (Electrochimica Acta Vol.43(1998), 3821–3828), and formic acid (Journal of Electrochemical Society, Vol.143 (1996), L158–L160). Besides these, this polymer electrolyte membrane has also been used for hydrogen sensors (Journal of Electrochemical Society, Vol.144 (1997), L95–L97), electrochemical capacitor and other electrochemical cells (see for example U.S. Pat. No. 5,688,613).

In addition to the acid-doped polybenzimidazole membrane electrolyte, high performance gas diffusion electrodes are also key components for high temperature polymer electrolyte membrane fuel cells. However, little effort has been made so far in this area, compared with other types of fuel cells such as phosphoric acid fuel cells or Nafion®-based polymer electrolyte membrane fuel cells. In the above-mentioned patents relating to the acid-doped PBI electrolyte fuel cells, little information about the manufacturing of gas diffusion electrodes has been included. There are some indications that phosphoric acid fuel cell electrodes have been used. For example, Wang et al. utilise phosphoric acid fuel cell electrodes, produced by E-TEK (Electrochimica. Acta, vol.41, (1996), 193–197), further treated by impregnation with the polymers. The authors have also made their own electrodes from platinum black, with a very high loading of platinum catalyst (2 mg/$cm^2$). In another publication, Wang et al. use platinum black (Johnson Matthey) and platinum-ruthenium alloy (Giner Inc.) for manufacturing cathode and anode by a filtering-pressing method, also with a very high loading of noble metal catalysts (4 mg/$cm^2$)(Journal of Applied Electrochemistry Vol.26(1996), 751–756).

U.S. Pat. No. 5,599,639 discloses an electrolytic membrane for use in fuel cells. The fuel cell assembly comprises a carbon paper substrate, a catalyst layer using a fluorinated resin as a binder, and polybenzimidazole resin electrolytic membrane. No specific information about the performance of such membranes in fuel cells was given.

U.S. Pat. No. 4,647,359 discloses a catalytic sandwich comprising a open pore carbon cloth and having on the one side a layer of catalytic carbon, i.e. platinum/carbon and a hydrophobic binder (e.g. PTFE), and on the other side a layer of a non-catalytic carbon in a hydrophobic binder (e.g. PTFE). The sandwich may be prepared by press fitting.

J. Electrochem. Soc. Vol. 143 (1996), L158–160, describe a fuel cell for oxidation of formic acid. The fuel cell comprises a polymer electrolyte comprising a phosphoric acid doped (5 moles $H_3PO_4$ per repeat unit) polybenzimidazole (PBI) as polymer electrolyte and electrodes including platinum black and platinum-ruthenium as catalyst, respectively. The catalyst loading was 4 mg/$cm^2$ and the electrodes were impregnated with 15–21 $\mu l/cm^2$ of 5 M $H_3PO_4$. The membranes were assembled by hot-pressing.

WO 99/04445 describes a membrane electrode constructed by providing successive layer of an electrode, a PBI paste/gel, a polymer fabric, a PBI paste/gel, and an electrode.

SUMMARY OF THE INVENTION

The present invention provides a method for the preparation of a polymer electrolyte membrane (PEM) for fuel cells, the method comprising the following steps:
  providing an acid-doped solid electrolyte;
  providing a gas diffusion cathode by:
    i) providing a first hydrophobic carbon support substrate by treatment of a carbon substrate with a hydrophobic polymer solution,
    ii) providing a first supporting layer on the first support substrate by casting a slurry onto the first support substrate, said slurry comprising carbon black, and a hydrophobic polymer,
    iii) providing a first catalyst layer on the first supporting layer by casting a slurry onto the first supporting layer, said slurry comprising carbon-supported noble metal catalysts and a polymer binder, and
    iv) doping the first catalyst layer with an acid or a mixture of acids, preferably a non-volatile acid and a volatile acid;
  providing a gas diffusion anode by essentially utilising the steps i)–iv) above, said gas diffusion anode comprising a second hydrophobic carbon support substrate, a second supporting layer and a second catalyst layer; and
  assembling the polymer electrolyte membrane (PEM) by sandwiching the gas diffusion anode, the solid electrolyte and the gas diffusion cathode so that the first catalyst layer and the second catalyst layer both are facing the solid electrolyte.

The assemblies prepared in this way give good performance and high tolerance to the fuel impurities e.g., carbon monoxide. Thus, the present invention also relates to the polymer electrolyte membranes (PEM) as such, to a fuel cell comprising a PEM and a method for operating the fuel cell.

The present invention also provides blend polymers especially useful as electrolytes for high temperature PEM fuel cells and in the method of the invention. The blend polymer electrolyte exhibits high ionic conductivity, enhanced mechanical properties at operational temperatures, and easiness to handle during preparation.

BRIEF DESCRIPTION OF THE DRAWINGS

FIG. 12. Illustration of the structure of a fuel cell.
1, gas channel,
2, anodic catalyst layer,
3, anodic supporting layer,
4, anodic back,
5, solid electrolyte (polymer membrane electrolyte),
6, anodic current collector,
7, cathodic current collector,
8, cathodic catalyst layer,
9, cathodic supporting layer,
10, cathodic back,
11, oxidant gas,
12, fuel gas,
13, carbon powder,
14, hydrophobic binder,
15, gas pores in supporting layer,
16, gas pores in catalyst layer,
17, carbon supported catalyst,
18, noble metal catalyst,
19, polymer binder.

DETAILED DESCRIPTION OF THE INVENTION

Figure 1:
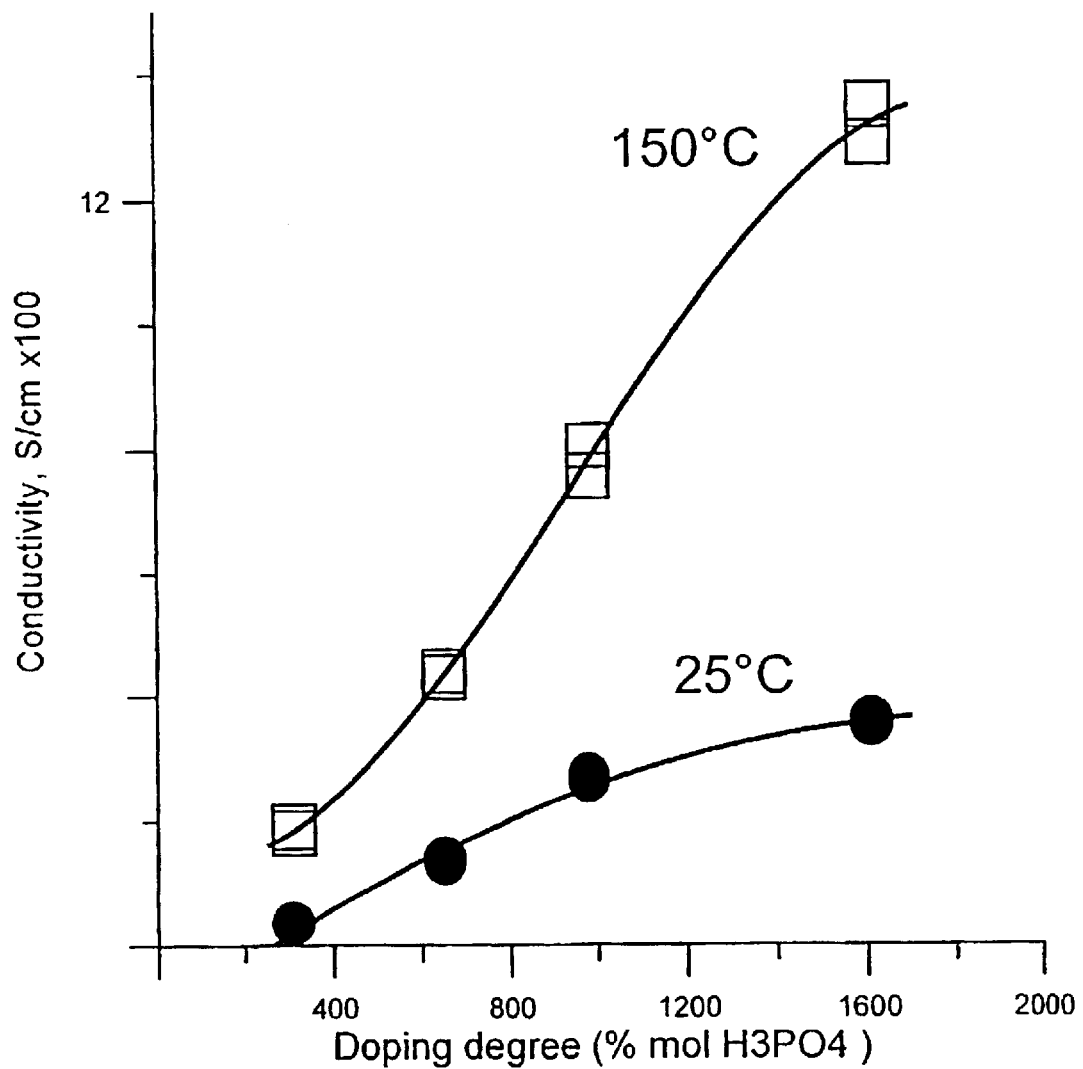
FIG. 1. Electric conductivity of PBI membranes as a function of doping level at different temperatures. Measurements were performed at a relative humidity between 61–78%.

The present invention will be explained in the following by describing each of the steps desirable or necessary for the invention as well as preferred embodiments.

The invention relates to methods for preparing assemblies for high temperature polymer membrane electrolyte fuel cells. The high temperature solid electrolytes can be prepared by a solution casting method and subsequent doping of the membrane with an acid. The fuel cell based on this technology can operate at temperatures of up to at least 200° C. and can tolerate up to at least 3 vol % carbon monoxide in the fuel steam, so that hydrogen-rich gas from a fuel reformer as well as methanol can directly be used for generation of electricity.

The terms "solid electrolyte" and "polymer membrane electrolyte" are interchangeable and are used to cover the same constituent of the polymer electrolyte membrane of the invention. The former term is used most frequently in order to avoid confusion between the term "polymer membrane electrolyte" and "polymer electrolyte membrane" (PEM). The term "blend polymer membrane" is a group of solid electrolytes comprising a polymer blend.

For operation of fuel cells, the state-of-the-art gas diffusion electrode is such that it provides a complicated interface between a gaseous reactant, a heterogeneous electrocatalyst, and an electrolyte. Two types of electric pathways are provided in this three-phase interface, i.e., an ionic conduction through the electrolyte and an electrical conduction through the supporting substrate. Improving the utilisation of noble metal catalysts can only be achieved by optimising the microstructure of the three-phase interface, since only catalyst particulate siting at the three-phase interface is electrochemically active. Technically this three-phase interface is normally achieved by constructing the gas diffusion electrode with a hydrophobic polymer and catalytic carbon powder.

In the following will be described the construction of the polymer electrolyte membrane (PEM) according to the invention and a preferred way of preparing the PEM.

Solid Electrolyte (Polymer Membrane Electrolyte)

On important step in the method is to provide an acid-doped solid electrolyte.

Polybenzimidazole/blend Polymers

The sold electrolyte facilitates ionic conduction and should therefore include a sufficient concentration of ionic species. Suitable polymers for this purpose include those containing basic groups that can form a single-phase electrolyte with thermally stable acids for application in a solid polymer electrolyte membrane fuel cell. Interesting examples of such polymers are selected from the group consisting of polybenzimidazole, poly(pyridine), poly(pyrimidine), polyimidazoles, polybenzthiazoles, polybenzoxazoles, polyoxadiazoles, polyquinolines, polyquinoxalines, polythiadiazoles, poly(tetrazapyrenes), polyoxazoles, and polythiazoles, in particular polybenzimidazoles and related families of compounds (see e.g., U.S. Pat. Nos. 4,814,399, 5,525,436, 5,599,639). More specific examples of polybenzimidazoles, typically with a molecular weight between 1000 and 100,000, are poly-2,2'-(m-phenylene)-5,5'-bibenzimidazole; poly-2,2'-(pyridylene-3", 5")-bibenzimidazole; poly-2,2'-(furylene-2",5")-5,5'-bibenzimidazole; poly-2,2'-(naphthalene-1",6")-5,5'-bibenzimidazole; poly-2,2'-(biphenylene-4",4")-5,5'-bibenzimidazole; poly-2,2'-amylene)-5,5'-bibenzimidazole; poly-2,2'-octamethylene-5,5'-bibenzimidazole; poly-2,6'-(m-phenylene)diimidazobenzene; poly-2'2'-(m-phenylene)5,5'-di(benzirnidazole)ether; poly-2'2'-(m-phenylene)5,5'-di(benzimidazole)sulfide; poly-2'2'-(m-phenylene)5,5'-di(benzimidazole)sulfone; poly-2'2'-(m-phenylene)5,5'-di(benzimidazole)methane; poly-2'2"-(m-phenylene)-5,5"-di(benzimidazole)-propane-2,2; and poly-2,2'(m-phenylene)-5',5"-di(benzimidazole)-ethylene-1,2. These polymers may be prepared from an aromatic diacid and an aromatic tetramine as described in the above U.S. patents.

The most preferred polymer is poly 2,2'-(m-phenylene)-5,5'-bibenzimidazole product, PBI, known as Celazole® provided by Hoechst Celanese. This polybenzimidazole is an amorphous thermoplastic polymer with a glass transition temperature of 425–436° C.

In a particularly interesting variant of the invention, a blend of one of the above-mentioned polymers and another thermoplastic polymer can be used as an advantageous alternative to the polybenzimidazole membrane electrolytes.

Polybenzimidazole and other of the above polymers can form miscible blends with a broad range of thermoplastics, due to the hydrogen bonding effect and interaction between the amine groups of the polybenzimidazole polymer (or other nitrogen-containing polymer) and carbonyl groups of the thermoplastic polymers. Suitably examples of thermoplastics, which are miscible and therefore useful with polybenzimidazole, include polyimides (PI), polyamides (PA), polyamideimide (PAI), polyetherimides (PEI), polyarylate (PAr), poly(4-vinyl pyridine) (PVPy), and sulfonated polysulfones (SPSF).

PEI is an amorphous high performance polymer, characterised by thermal and chemical resistance and excellent mechanical properties. The base polymer has a transparent amber brown colour and is manufactured by polycondensation. PEI has a transition temperature of 217–220° C. with a chemical structure (Scheme A):

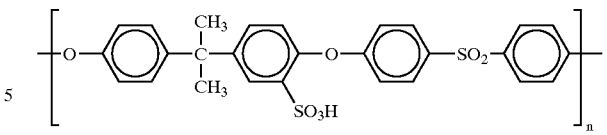

Scheme C. Sulfonated PSF

It is demonstrated in the present invention that the sulfonated polysulfone (SPSF) can form a miscible blend with polybenzimidazoles, such as PBI, due to participation of functional groups in hydrogen-bonding interactions. This allows a simple solution casting of the blend polymer membranes.

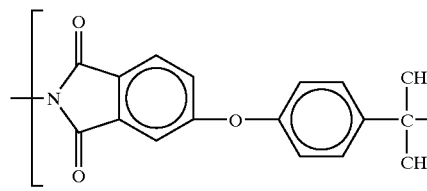

Scheme A. Polyetherimide

Concerning the mechanical properties PEI breaks at an elongation of 33%, while PBI breaks at only 1.8–3.0%. The polymer blends are therefore expected to exhibit improved mechanical properties [See Specialty Polymers, ed. R. W. Dyson, Blackie Academic & Professional, 1998]. A commercially available example of PEI is Ultem 1000 provided by GE Plastics.

Another group of suitable thermoplastics are by nature immiscible with polybenzimidazoles An example is polysulfone (PSF), which has a transition temperature of 190° C. and exhibit excellent mechanical properties with a chemical structure (Scheme B):

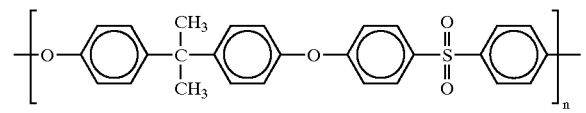

Scheme B. Polysulfone (PSF)

The elongation at break for PSF, for example, is reported to be 50–100%, compared again to 1.8–3.0% for PBI [See Specialty Polymers, ed. R. W. Dyson, Blackie Academic & Professional, 19989]. As T. S. Chung reported [Polym. Eng. Sci., 34, 428, (1994)], blends of PSF and PBI forms high performance fibres despite the immiscibility of the two polymers. However, such polymers may be rendered miscible with polybenzimidazoles, e.g. by formation of ionomers thereof such as by sulfonation. Ionomers, defined as polymers containing a small amount of bonded ionic groups, are generally promising polymers for promoting miscibility with various types of polymers. The ionic functional groups are believed to facilitate specific interactions such as hydrogen bonding. Sulfonation of PSF has been reported [see Polym. Eng. Sci., 33, 1042, (1993)], making the polymer (see Scheme C) bear functional groups and exhibit high glass transition temperatures.

This being said, SPSF is a preferred thermoplastic polymer for mixing with polybenzimidazoles (such as PBI) or other polymers. Blends of polybenzimidazole or other polymers with SPSF can be performed as follows: Sulfonated PSF (SPSF) in form of the salt, e.g. sodium salt, is prepared by using chlorosulfonic acid or another suitable suffonating agent in an aprotic solvent, e.g. in dichloroethane solution. The sulfonated PSF can subsequently be purified and can be dissolved in dimethylacetamide (DMAc) under stirring at room temperature. Polyetherimide is normally first dried under vacuum, and then dissolved in dimethylacetamide under stirring at room temperature. The polymer blend solution is then diluted (if necessary) for mixture with polybenzimidazole or another polymer and for subsequent membrane casting (described below).

Thus, in a preferred embodiment, solid electrolyte essentially consist of a polymer blend comprising a polybenzimidazole, in particular poly(2,2'-(m-phenylene)-5, 5'-bibenzimidazole), and a thermoplastic polymer, preferably selected from polyimides (PI), polyamides (PA), polyamideimides (PAI), polyetherimides (PEI), polyarylate (PAr), poly(4-vinyl pyridine) (PVPy), and sulfonated polysulfone (SPSF), in particular sulfonated polysulfone (SPSF).

The solid electrolyte may comprise minor amounts of other constituents, however it is presently preferred that the solid electrolyte essentially (i.e. at least 98 wt %, such as at least 99.5 wt %) consist of a polybenzimidazole or a polymer blend comprising a polybenzimidazole and a thermoplastic polymer.

In particular, the polybenzimidazole is poly(2,2'-m-(phenylene)-5,5'-bibenzimidazole. The solid electrolyte preferably comprising 10–75 mol %, preferably 20–60 mol % of the polybenzimidazole. The thermoplastic polymer is preferably a ionomer prepared by sulfonation of a polysulfone, preferably with a sulfonation degree of 5–80%, in particular 15–60%.

Casting of Solid Electrolytes

Before preparation of a membrane of the solid electrolyte, the polymer powder (e.g. a grain size of ~100 mesh) is typically mixed with dimethylacetamide (DMAc) or another suitable solvent and contained in a stainless steel bomb reactor. Lithium chloride is added as a stabiliser. Oxygen is preferably excluded from the bomb by bubbling argon through the mixture solution. The bomb reactor is then closed and placed in a rotating oven for homogenisation, e.g. at 250° C. for 3–5 hours. The solution is then diluted for the final membrane casting.

The casting of the sold electrolyte (either a polymer or a polymer blend) can be performed essentially as described by Fekete et at. (Polymer Bulletin. vol.39 (1997), 93–99). Blends of PBI/SPSF and PBI/PEI can be obtained by mixing the corresponding polymer solutions in a desired ratio. A certain amount of the solution is poured into a glass dish and the majority of the solvent is evaporated in a ventilated oven at 80–120° C. (a suitable temperature range for DMAc) for about 50 hours. The membranes is subsequently washed with distilled water (typically at around 80° C.) to remove the residual solvent and stabilising salts, and finally dried at 150–200° C., such as around 190° C. Preparation of polybenzimidazole membranes is also described in U.S. Pat. No. 5,599,639.

Acid Doping of the Solid Electrolytes

Chemically, the PBI as other polybenzimidazoles possess both donor and acceptor hydrogen-bonding sites which are capable to participate in specific interactions. In the presence of acids or bases, a polybenzimidazole polycation can be formed resulting in acid or base neutralisation in the formation of a salt with the imidazole ring structure. An electrolyte active species dispersed within the polymer structure is a necessity for proton conduction. The proton conducting active species can be either an acid (such as phosphoric acid $H_3PO_4$, sulfuric acid $H_2SO_4$, hydrochloric acid HCl, nitric acid $HNO_3$, and their combinations) or a base (such as metal hydroxides KOH, NaOH, LiOH, and their combinations).

In this invention, the membranes are typically doped with an acid in a preselected concentration. The acid should be a non-volatile acid, e.g. having a very low vapour pressure in order to allow an operational temperature as high as up to at least 200° C.

Phosphoric acid is an example of a suitable acid to be used as doping acid for polybenzimidazoles and their blend polymer membranes.

Figure 6:
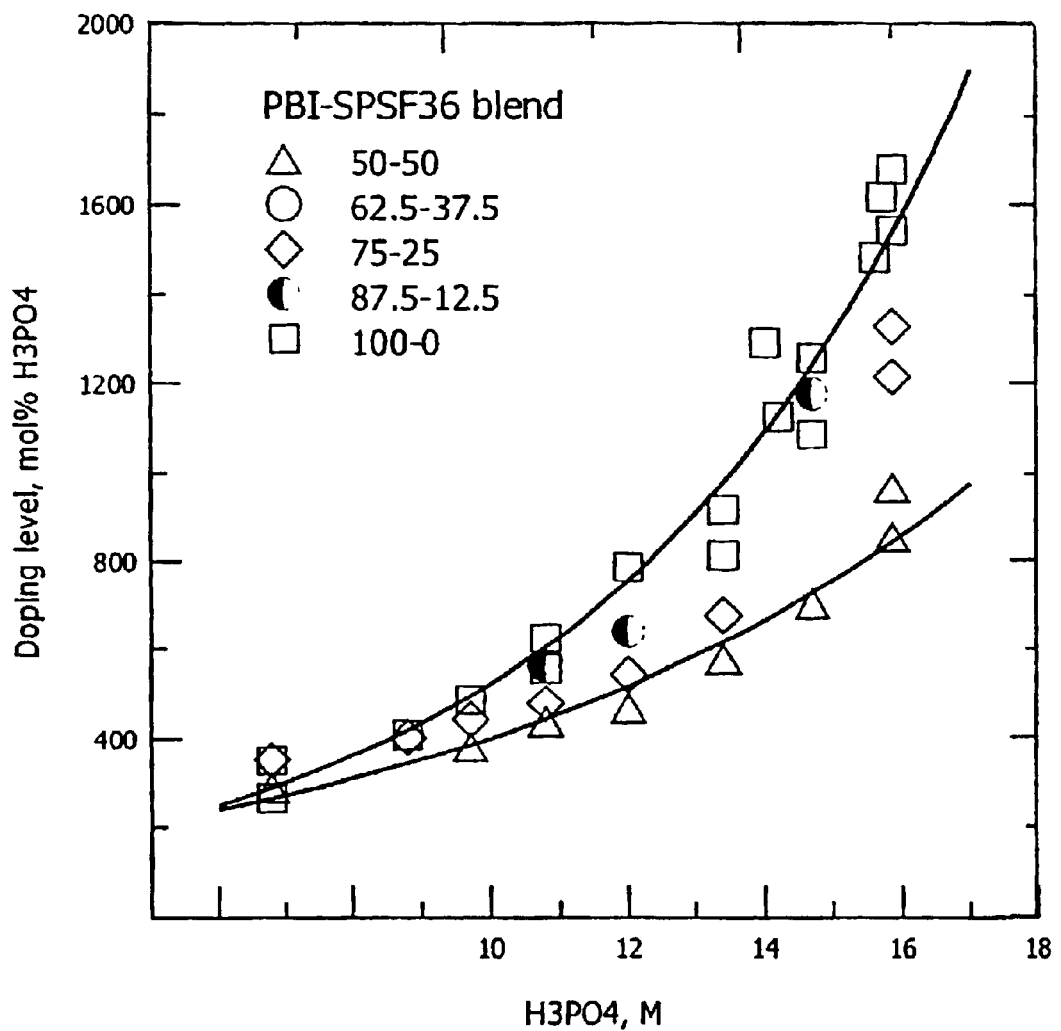
FIG. 6. Doping level of PBI/SPSF blend membranes as a function of acid concentration at room temperature. Sulfonation degree of PSU was 36%. The PBI/SPSF blend compositions are 50-50, 62.5-37.5, 75-25, 87.5-12.5, and 100-0 mol %.

The conductivity of a combined $PBI/H_3PO_4$ membrane electrolyte is found to be dependent on the acid-doping level. The doping level is defined as the molar ratio of the doping acid to PBI (repeating unit), or doping acid to the average value of PBI and the blending polymer (repeating units) where a polymer blend is used. The obtained doping level will depend on the concentration of the acid (from 25 to 90 wt %) and doping temperature (from 25 to 150° C.). FIG. 6 shows doping levels of pure PBI and PBI/SPSF blend membranes as a function of phosphoric acid concentration at room temperatures. Pure PBI membranes are more easily doped than polymer blend membranes.

Figure 7:
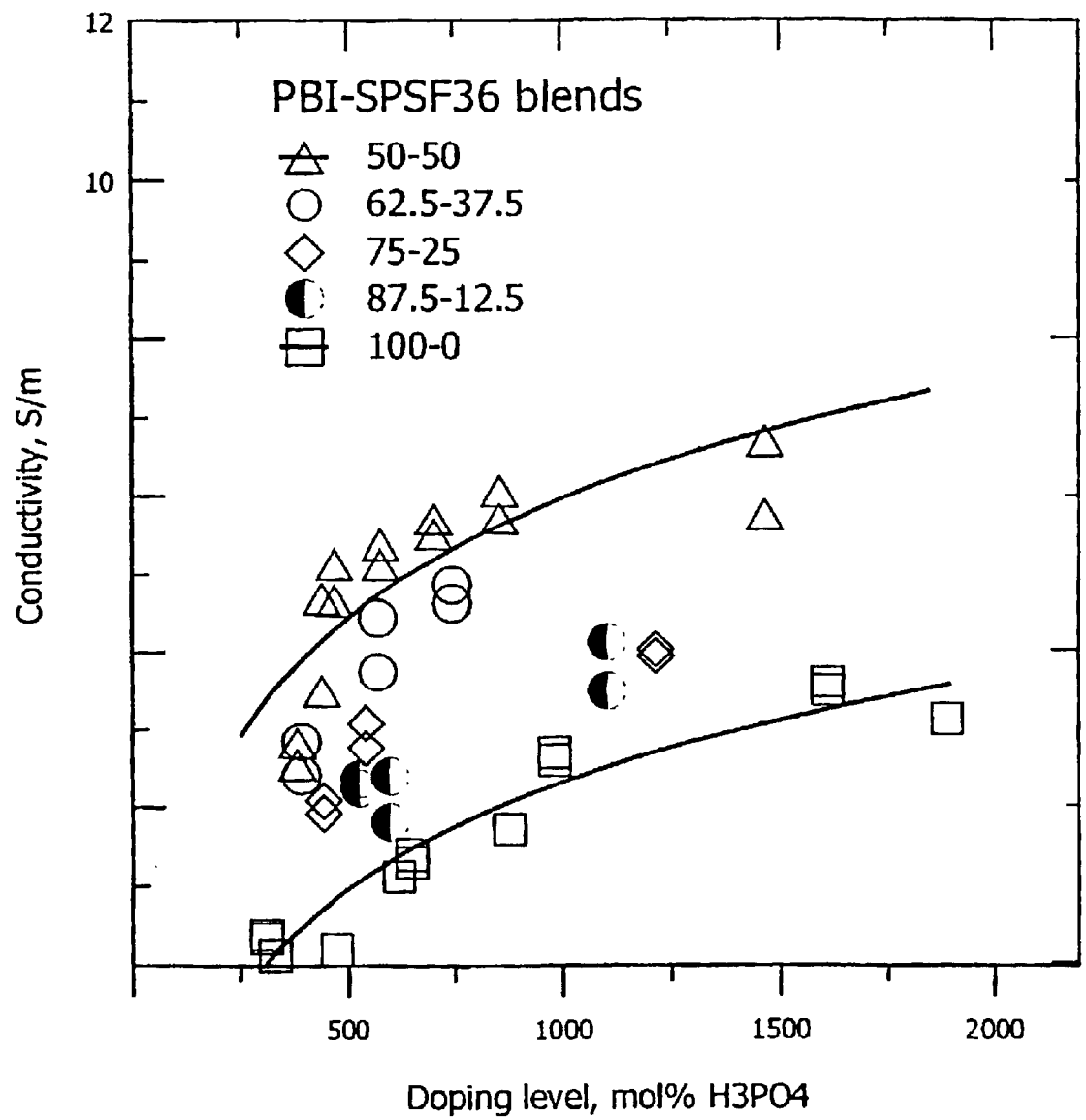
FIG. 7. Ionic conductivity of PBI/SPSF blend membranes as a function of doping level at temperature of 25° C. and relative humidity of 80%. Sulfonation degree of PSU was 36%. The PBI/SPSF blend compositions are 50-50, 62.5-37.5, 75-25, 87.5-12.5, and 100-0 mol %.
Figure 8:
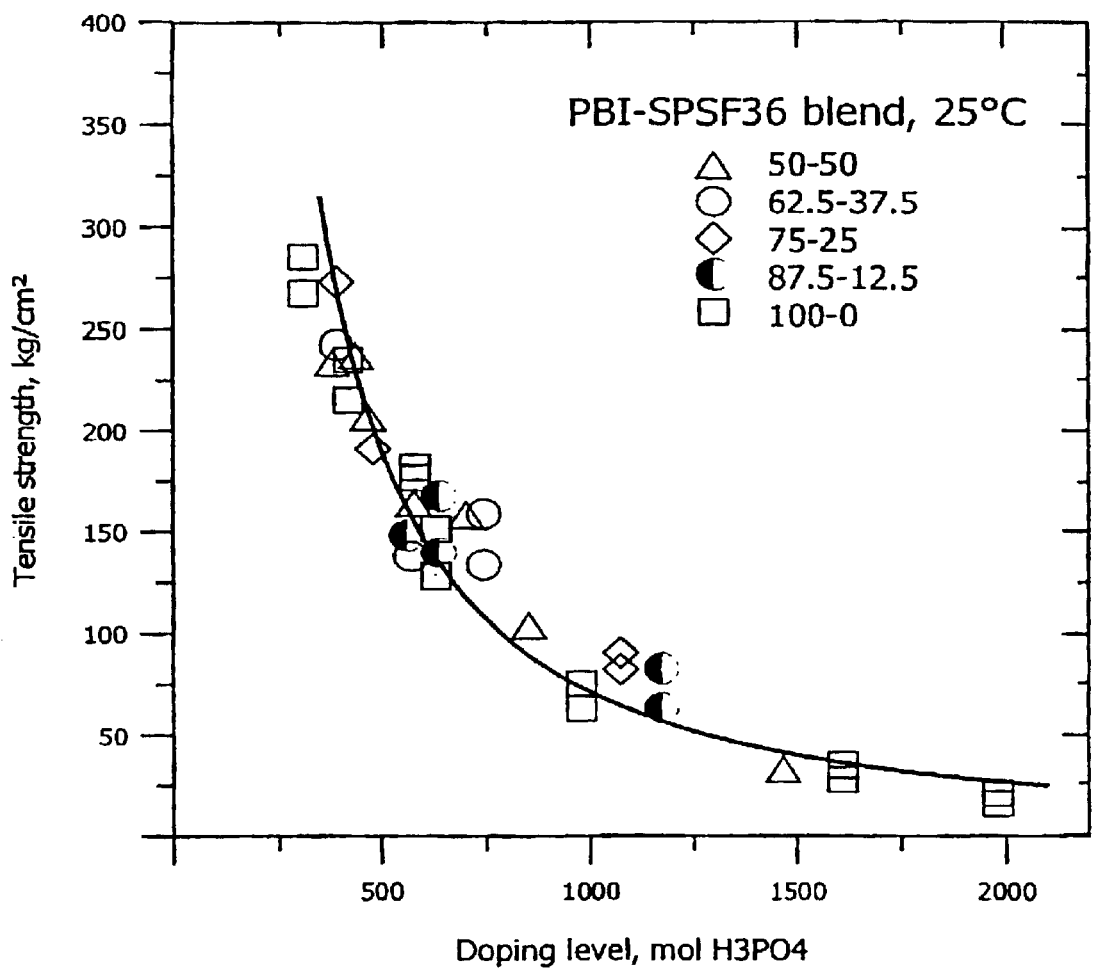
FIG. 8. Mechanical strength of PBI/SPSF blend membranes as a function of doping level at temperature of 25° C. Sulfonation degree of PSU was 36%. The PBI/SPSF blend compositions are 50-50, 62.5-37.5, 75-25, 87.5-12.5, and 100-0 mol %.
Figure 9:
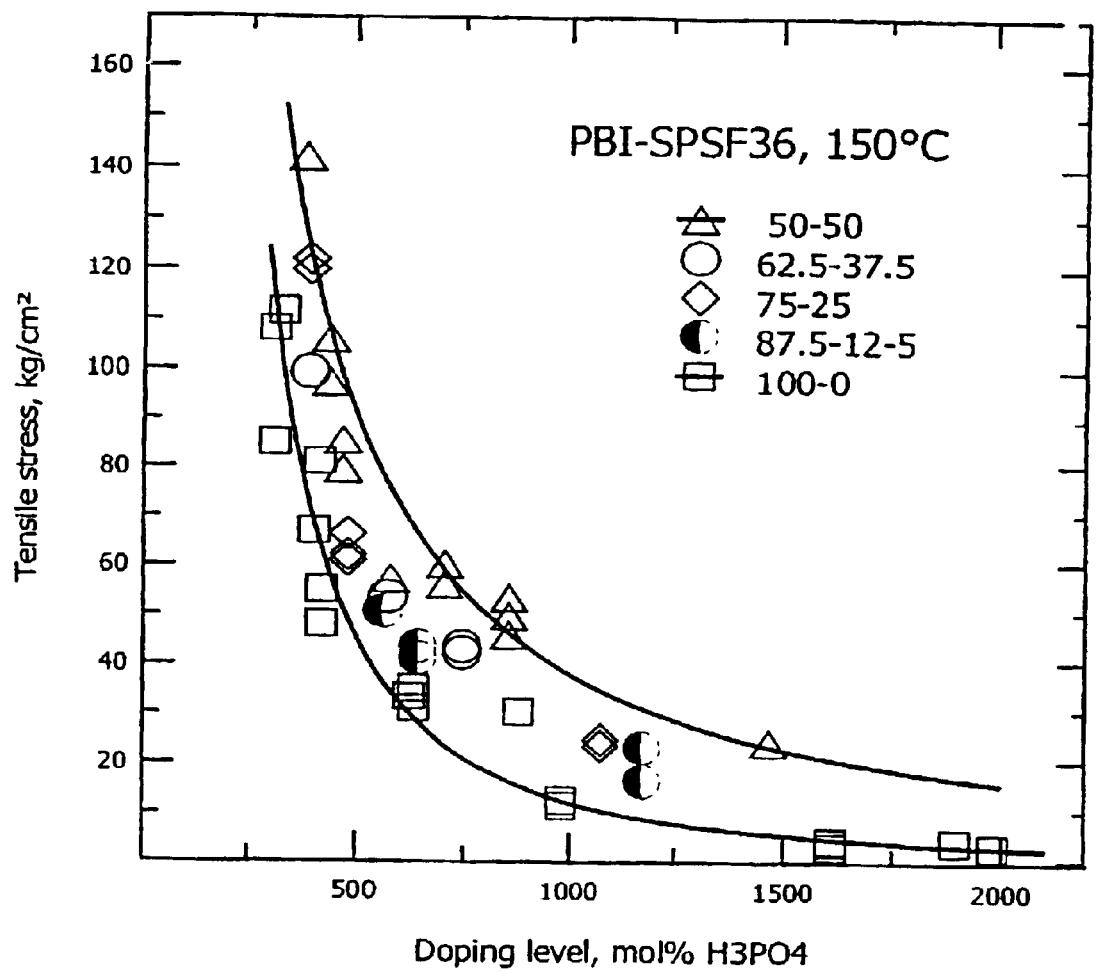
FIG. 9. Mechanical strength of PBI/SPSF blend membranes as a function of doping level at temperature of 150° C. Sulfonation degree of PSU was 36%. The PBI/SPSF blend compositions are 50-50, 62.5-37.5, 75-25, 87.5-12.5, and 100-0 mol %.

For pure PBI, the membranes exhibit high electric conductivity but low mechanical strength at high doping levels (See FIGS. 7, 8 and 9). A doping level between 2.5 and 10.0 is normally preferred. As will be apparent from the examples, such a doping level can provide an electrical conductivity of 0.001–0.08 S/cm and a tensile stress of 18–110 $kg/cm^2$ at temperatures around 150° C. At doping levels around 1500 mol % H3PO4, a proton conductivity as high as 0.13 S/cm is obtained at temperature of 150° C. and relative humidity of 80%. However, the high doping level results in a certain reduction in the mechanical strength of the membrane which will limit its application in a fuel cell. By increasing the doping level from 4 to 10, for example, the tensile strength decreases from 220 to 60 $kg/cm^2$ at room temperature. This phenomenon may be irrelevant for some applications, but may be prohibitive for other applications.

Thus, in preferred embodiment, solid electrolyte is doped with a non-volatile acid, preferably sulfuric acid or phosphoric acid, in particular phosphoric acid, said acid preferably having a concentration of 40–90 wt %.

The doping level, defined as the mole percentage of the doping acid per repeat unit of the polymer, is preferably 250–800 where the solid electrolyte essentially consist of a polybenzimidazole, and preferably wherein the doping level is 200–750 where the solid electrolyte essentially consist of a polymer blend.

A further aspect of the present invention relates to a solid electrolyte for polymer electrolyte membrane fuel cells, said solid electrolyte comprising a blend of a polybenzimidazole and one or more other thermoplastic resins doped with acid. The polybenzimidazole is preferably poly(2,2'-m-(phenylene)-5,5'-bibenzimidazole (PBI). The electrolyte typically and preferably comprises 10–75 mol %, preferably 20–60 mol % of the polybenzimidazole. The thermoplastic polymer is typically selected from polyimides (PI), polyamides (PA), polyamideimide (PAI), polyetherimides (PEI), polyarylate (PAr), poly(4-vinyl pyridine)(PVPy), and sulfonated polysulfons (SPSF), such as a ionomer prepared by sulfonation of a polysulfone, preferably with a sulfonation degree of 5–80%, in particular 15–60%. Preferably, the acid with which the electrolyte is doped is a non-volatile acid, in particular selected from phosphoric acid or sulfuric acid, said acid preferably having a concentration of 40–90 wt %.

Gas Diffusion Electrodes

The construction and preparation of the gas diffusion electrodes will be explained in the following.

Hydrophobic Carbon Support Layer

The electrically conducting carbon support substrate may, e.g., be selected from various fibrous carbon materials in the form of a carbon paper, a carbon cloth or the like. It is however generally desirable that the materials have low electric resistance in the operational temperature range of a fuel cell. For convenience of tape-casting, carbon fibrous paper, e.g., Toray TGP-H-120, is preferred. In order to provide the hydrophobic carbon support substrate, the carbon substrate is normally wet-proofed by immersing the substrate in a hydrophobic polymer dispersion, such as a solution of fluorinated ethylene propylene or polytetrafluoroethylene (PTFE), and then dried and sintered. Sintering is normally conducted at a temperature of 320–400° C., such as at around 360–370° C., for 10–200 minutes such as for around 20 minutes. The loading of the hydrophobic polymer is controlled by changing concentration of the dispersion as will be understood by the person skilled in the art. By loading a hydrophobic polymer at a high level, this backing is permeable to gas reactants.

Supporting Layer

Onto the hydrophobic carbon support substrate, a layer of carbon black containing a lower level of a hydrophobic polymer is prepared. This layer comprises of a mass of tiny supporting particles with small pores. The supporting particles can be free from any noble metal catalysts or with a small amount of catalysts (0.005–0.01 $mg/cm^2$). The layer preferably comprises 30–80 wt %, such as 40–60 wt %, carbon black, preferably without any noble metal catalyst, but if present a noble metal catalyst corresponding to a loading of up to 0.01 $mg/cm^2$ in the finished layer). Furthermore, the layer comprises 20–70 wt %, such as 60–40 wt %. of a hydrophobic polymer, such as fluorinated polymers, e.g. fluorinated ethylene propylene or polytetrafluoroethytene (PTFE).

Tape casting is the typical and preferred method for preparing the support layer; the tape casting is typically followed by drying and sintering. Hence, the supporting layer is typically prepared by providing a slurry of carbon powder and the fluorinated polymer (e.g. PTFE) in the predetermined ratio and applying the slurry on to the hydrophobic backing substrate carbon paper to form a supporting layer. After sintering at a temperature of 320–400° C., such as 360–370° C. for 5–200 minutes, such as 10–15 minutes, this layer is rendered hydrophobic. In addition, this layer provides a smooth surface of tiny particles and therefore prevents the catalyst layer from cracking.

Catalyst Layer

The catalysts for use in the polymer electrolyte membranes of the present invention are noble metals from Group VIII of the periodic table, particularly platinum (Pt), ruthenium (Ru), alloys of Pt—Ru, etc. Furthermore, composite catalysts may be used, e.g. platinum with chromium, titanium, tungsten or the like. Platinum and platinum/ruthenium alloys (3:1 to 1:3 alloys such as a 1:1 alloy (atomic ratio)) are presently preferred.

The catalysts are typically used as metal-carbon particles carrying the catalyst. Such particles are prepared by first providing, e.g., the chloroacid of the relevant noble metal, such as platinum and ruthenium and depositing the metal onto the surface of a high surface area carbon black. Different types of carbon black of high surface area (typically from 200 to 1000 $m^2/g$), either graphited or nongraphited, can be used as supporting materials. With help of a surface agent, e.g., acetic acid, the metal ions can be chemically reduced by using a reducing agent selected from, among others, formic acid, formaldehyde, sodium borohydride, etc. The obtained carbon supported catalyst was then filtered and washed with distilled water and dried and ground into fine powder. Alloying of metals can be prepared by using a mixture solution of the relevant metal chloroacids.

Carbon supported noble metal catalyst, with a weight ratio of the noble metal to carbon 0.5:9.5 to 4:6, such as from 1:9 to 2:8, is then mixed with a polymer solution, such as a polybenzimidazole solution or a polybenzimidazole blend solution in dimethylacetamide. The slurry is then applied onto the supporting layer. It will wet the supporting layer and partly penetrate into the structure. In this way, the supported catalyst is in good contact with the proton-conductive polymer as well as with the gas-accessible supporting particles. The electrodes are then dried and sintered at 110–190° C. for 3–180 minutes such as 3–15 minutes. The concentration of the polymer solution is often of importance for the fluidity of the slurry. It is important to remark that, when the polybenzimidazole blend polymer solution is used instead of pure polybenzimidazole solution, the porous catalyst layer tend to be smoother and possible cracking is avoided. The loading of polybenzimidazole or polybenzimidazole blend in the catalyst layer of electrodes is preferably around 0.2–2.5 $mg/cm^2$. The electrodes made in this way have a noble metal (e.g. platinum) loading of 0.1–1.0 $mg/cm^2$, such as 0.2–0.8 $mg/cm^2$.

The catalyst layer is typically formed by slurry casting and subsequently dried and sintered as described above.

The catalyst layer in the gas diffusion electrodes, as described above, contains a polybenzimidazole polymer component or a polybenzimidazole blend. This polymer needs to be doped with an acid in order to achieve the protonic conductivity. This is done with a mixture of a non-volatile acid and a volatile acid. The non-volatile acid is as defined above, and is often and most preferred the same acid as used for doping the sold electrolyte, i.e., either sulfuric acid or phosphoric acid. In contrast to the non-volatile acid. The volatile acid should have a high vapour pressure in a temperature range of 20–120° C. Examples of volatile acids are trifluoroacetic acid or acetic acid. The volatile acid is preferably used to facilitate the wetting of the dopant solution on the surface of the electrode. The amount of the non-volatile acid used for doping is critical since excessive acid will reduce the membrane strength, in particular when the membrane-electrode assembly is made by means of hot-press. This amount is determined by the polymer content in the catalyst layer of electrodes. A molar ratio of the non-volatile acid to the polymer content is preferred in a range from 2/1 to 20/1, and in particular from 10/1 to 15/1. The weight ratio between the non-volatile acid and the volatile acid is typically from 3/7 to 9/1, in particular from 3/2 to 4/1. The concentration of both acids is selected by considering the coverage of the liquid acid to the electrode surface, and preferred in a range from 2 to 30 wt %, such as 2–20 wt %, for the non-volatile acid and from 60–100 wt % for the volatile acid.

Preferably, the acid mixture comprises 30–70 wt % non-volatile acid and 30–70 wt % volatile acid. In particular, the non-volatile acid is phosphoric acid or sulfuric acid and the volatile acid is trifluoroacetic acid or acetic acid.

The electrode so prepared is ready for assembly. It should be noted that an anode and a cathode is normally prepared essentially using the same method. Often, the only difference is the noble metal catalyst used. The gas diffusion cathode normally used for reducing an oxygen-containing oxidant gas and the gas diffusion anode is used for oxidising a fuel gas, in particular a hydrogen-rich fuel gas. In a preferred polymer electrolyte membrane, the anode preferably comprises a Pt—Ru catalyst and the cathode preferably comprises a Pt catalyst.

Preferably, the catalyst layer essentially consists of 30–55 wt % catalyst powder, preferably comprising a platinum catalyst for the cathode and a platinum-ruthenium catalyst for the anode, and 70–45 wt % polymer (or polymer mixture), preferably polybenzimidazole (such as PBI) or a polymer (mixture) comprising a polybenzimidazole, such as PBI, and a thermoplastic polymer.

When referred to in the present description with claims, the term "first", e.g. "first catalyst layer", refers to the cathode, while the term "second", e.g. "second catalyst layer", refers to the anode. These terms are used in order to be able to differentiate between the parts of the anode and the parts of the cathode, respectively.

Membrane-electrode Assembling

The polymer electrolyte membrane is assembled by sandwiching the gas diffusion anode, the sold electrolyte and the gas diffusion cathode so that the first catalyst layer and the second catalyst layer both are facing the sold electrolyte.

Assembling is preferably effected by means of hot-press. Particularly advantageous polymer electrolyte membranes are prepared when the hot-pressing is performed at a temperature of 80–200° C., such as 130–200° C., at a pressure of 0.1–1.5 bar, such as 0.3–1.0 bar. It is often sufficient and desirable to perform the hot-pressing for 2–45 minutes, such as 5–35 minutes.

The polymer electrolyte membranes prepared according to the present invention will typically have a thickness from 60–180 $\mu$m, however, the specific thickness for a selected application will depend on the catalyst loading, catalyst ratios and pressure.

Thus, the present invention also provides a polymer electrolyte membrane (PEM) for use in fuel cells, said membrane comprising the following successive layers:

i) a first hydrophobic carbon support substrate including a hydrophobic polymer;
ii) a first supporting layer comprising carbon black and a hydrophobic polymer;
iii) a first catalyst layer comprising a carbon-supported noble metal catalyst and a polymer or polymer blend as binder, said first catalyst layer being doped with an acid or a mixture of acids, preferably a non-volatile acid and a volatile acid;
iv) a acid-doped solid electrolyte
v) a second catalyst layer comprising a carbon-supported noble metal catalyst and a polymer or polymer blend as binder, said first catalyst layer being doped with an acid or a mixture of acids, preferably a non-volatile acid and a volatile acid;
vi) a second supporting layer comprising carbon black and a hydrophobic polymer; and
vii) a second hydrophobic carbon support substrate including a hydrophobic polymer.

The PEM is preferably obtainable, in particular obtained, by the method defined above.

As mentioned above, the first catalyst layer and the second catalyst layer are preferably not identical.

In general, the polymer electrolyte membrane (PEM) typically shares one or more of the characteristics defined above.

Single Cell Tests and Carbon Monoxide Tolerance

The PEM of the present invention, preferably prepared according to the invention, is—as will be apparent from the above—particularly useful for fuel cells where a relatively high content of carbon monoxide should be allowed in the fuel steam.

The present invention consequently also relates to a polymer electrolyte membrane fuel cell which includes the PEM as defined herein. One example of a general fuel cell is illustrated in FIG. 12. A PEM fuel cell assembly typically consists of an ionically conductive sold electrolyte 5 with a thin layer 2, 8 of dispersed noble metal catalysts 18 bonded onto each side. A supporting layer 3, 9 is in immediate contact with the catalyst layer 2, 8, which is attached to the solid electrolyte 5. The supporting layer is made of carbon powder 13 using a hydrophobic binder 14, among them micropores 15 are distributed for gas penetration (see the magnified view FIG. 12A) The catalyst is noble metal 18 dispersed on carbon black powder 17. The catalyst layer 2, 8 is prepared by using a polymer 19 as binder, which is a ionic conductor when treated with a proton conducting active species. Among the supported catalyst 17 and polymer binder 19 micropores 16 are distributed for reactant gas to access to the catalytically active sites (see the further magnified view FIG. 12B). Both supporting and catalyst layers are supported by electrode backs 4, 10, which are made of hydrophobised carbon paper or carbon cloth. A single PEM fuel cell is completed by current collector plates 6, 7 with gas flow channels 1 and both oxidant gas 11 and fuel gas 12 supply. These plates become bipolar plates in a fuel cell stack, where they have gas flow channels on both sides. For automobile uses, a plurality of fuel cells will normally be arranged taking into consideration the desired voltage and the maximum current load.

This being said, a further aspect of the present invention relates to a polymer electrolyte membrane fuel cell comprising a polymer electrolyte membrane (PEM) which comprises a first hydrophobic carbon support substrate 10, a first supporting layer 9, a first catalyst layer 8, an acid doped solid electrolyte 5, a second catalyst layer 2, a second supporting layer 3, and a second hydrophobic carbon support substrate 4; said first and second carbon support substrates being in contact with current collector plates 7 and 6, respectively, with gas flow channels 1 and both oxidant gas 11 and fuel gas 12 supply. The PEM is preferably as further defined above.

It is well known that the Nafion®-based membrane electrolyte usually has a large electro-osmotic drag number, i.e., water moves from the anode side to the cathode side during cell operation, resulting in the requirement of an intensive gas humidification to maintain an adequate membrane hydration. This, together with operational temperatures near the boiling point of water makes the cell operation very critical with respect to both water and heat management. In particular, the PBI based polymer blend PEM are found to have a water drag coefficient of virtually zero. As a consequence of the reported nearly zero water drag coefficient of the high temperature PEM, the fuel cell based on a polybenzimidazole membrane can operate with no humidification of the reactive gases, i.e., the internally formed water is enough to maintain the solid electrolyte. The elimination of humidification substantially simplifies the construction and operation of the polymer fuel cell.

The poisoning effect of platinum catalysts by carbon monoxide has been intensively studied by many investigators in the field of fuel cells and electrocatalysts (see for example J. Electrochem. Soc., 133, 1574 (1986), and J. Electrochem. Soc., 134, 3021 (1987)). These studies have mainly been concentrated on the mechanism of adsorption and oxidation and the nature of the absorbed species on the noble metal electrodes in various acid electrolytes. Two kinds of adsorption mechanisms have been proposed, i.e. the linearly and bridge or multi-bonded CO species. As assumed, the linearly absorbed carbon monoxide species, —CO, involve one adsorption site per CO particle, whilst the bridge or multi-bonded carbon monoxide species, =CO, require two or more adjacent platinum surface sites. In the case of hydrogen oxidation on a carbon-supported platinum gas-diffusion electrode in the presence of carbon monoxide, the poisoning effect is found to depend on the ratio of carbon monoxide concentration to the hydrogen concentration, $[CO]/[H_2]$. This indicates that the poisoning is a simple competition with hydrogen for active sites, since the strong chemisorptive bond of the carbon monoxide molecule may lead to a surface blockage from hydrogen oxidation.

In the present invention, it is found that the poisoning effect of CO is suppressed by the presence of water vapour at temperatures around 200° C. The possible mechanism is the chemical and/or electrochemical oxidation of carbon monoxide at the surface of electrode catalysts, i.e., the water vapour in the CO-containing fuel steam preferably oxidises carbon monoxide via a water-gas shift reaction with help of the electrode catalysts.

The fact that the high temperature polymer electrolyte membrane fuel cell can tolerate CO 2000–3000 times higher than that for Nafion®-based polymer electrolyte fuel cells, will decisively simplify or potentially eliminate the CO removal processors from a reforming system. The resulting power system will therefore be much more compact, light and cost-efficient with enhanced power density and improved transient performance. This is of special importance for automobile applications.

This being said, another aspect of the invention relates to a method for operating a polymer electrolyte membrane fuel cell, said fuel cell comprising a gas diffusion cathode for reducing an oxygen-containing oxidant gas, a gas diffusion anode for oxidising a hydrogen-rich fuel gas, and a solid electrolyte, said solid electrolyte consisting of an acid-doped membrane comprising polybenzimidazole, the method comprising the steps of feeding an oxidant gas to the cathode of the fuel cell and feeding a fuel gas, preferably a hydrogen-rich fuel gas, to the anode of the fuel cell, the temperature of the fuel cell being 25–250° C., such as 130–200° C. The fuel cell is preferably as defined above.

In a preferred embodiment of the method of the invention, the carbon monoxide content of the fuel gas constantly or intermittently is at least 0.5 vol %, such as at least 1.0 vol %, e.g. at least 2.0 vol % or at least 3.0 vol %. Thus, it should be understood that the mode of operation will not require that carbon monoxide is removed from the fuel gas before feeding to the fuel cell.

Further relevant embodiment of the method are those where the oxygen-containing gas is not humidified before feeding, and those where the (hydrogen-rich) fuel gas is humidified at room temperature.

EXAMPLES

Methods and Materials

Materials

Poly-2,2'-(m-phenylene)-5,5'-bibenzimidazole (PBI) powder was obtained from Celanese. Polysulfone with a molecular weight of approx. 26,000 was supplied by Aldrich, and was sulfonated by using sulfur trioxide as the sulfonating agent. Polyether-imide was obtained from GE Plastics. Other chemicals and solvents were obtained in analytical grade, if possible.

Preparation of Pt/C Catalyst Powder

Platinum chloroacid was first prepared by dissolution of metallic platinum in a mixture of concentrated nitric acid and hydrochloride acid. The platinum chloroacid was then mixed with carbon powder (Vulcan XC-72, Cabot). With help of surface active agents, e.g. acetic acid, the noble metal was chemically reduced on the surface of the carbon powder at 95° C. The obtained carbon-supported platinum catalyst (20 wt % Pt) was then filtered, washed with distilled water, dried, and finally ground into a fine powder.

Preparation of Pt—Ru/C Powder

Platinum chloroacid was first prepared by dissolution of metallic platinum in a mixture of concentrated nitric acid and hydrochloride acid. Ruthenium chloride (hydrated) was provided by Aldrich. A mixture of platinum chloride and ruthenium chloride of the metal atom ratio 1:1 was slurried with carbon powder (V(ulcan XC-072, Cabot) and chemically reduced at 95° C. The Pt—Ru/C catalyst was filtered, washed with distilled water, dried, and finally ground into fine powder.

Single Cell Test Set-up

Figure 10:
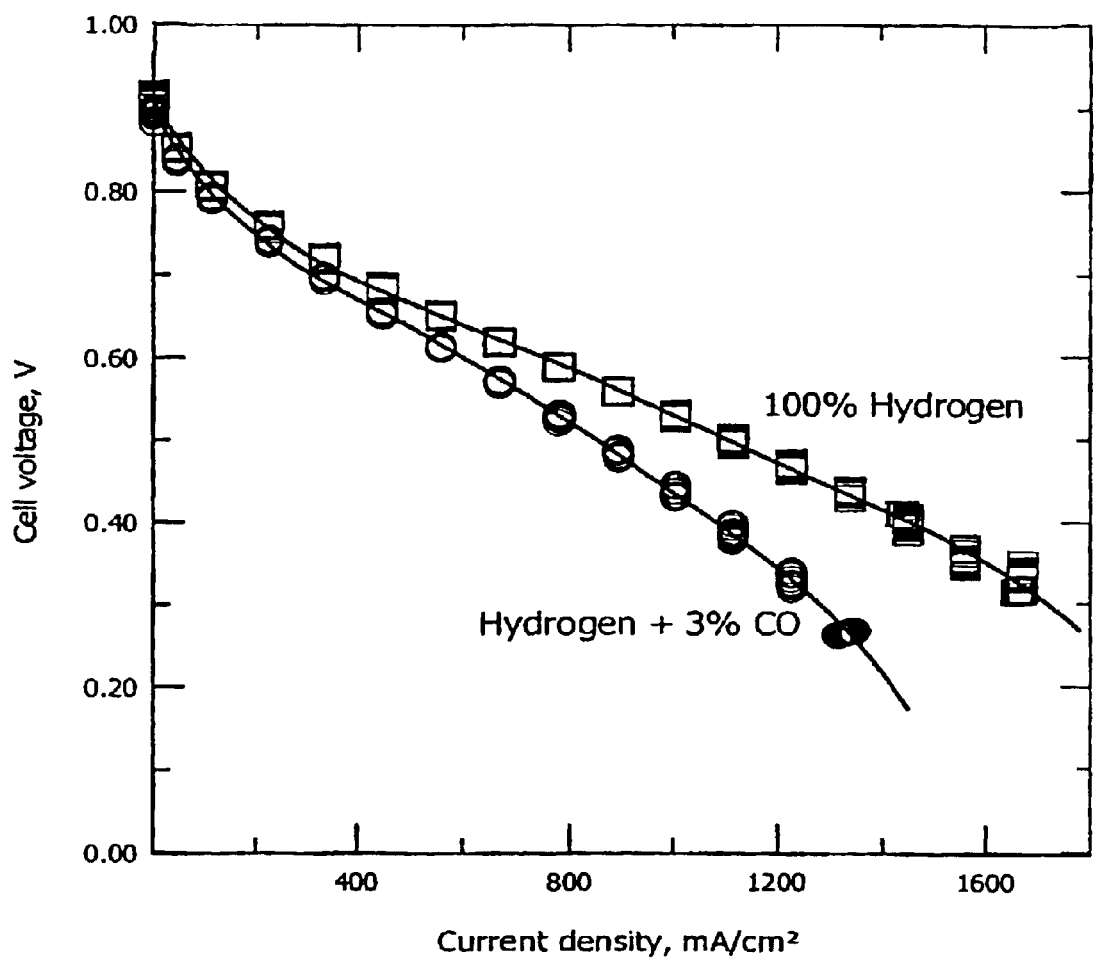
FIG. 10. Cell voltage versus current density curves of the high temperature polymer electrolyte membrane fuel cell at 190° C. Electrodes with a platinum loading of 0.45 mg/cm$^2$; the PBI/SPSF membrane at doping level of 4.5/1; oxygen at 1 bar and 200 ml/min; hydrogen and hydrogen containing 3% CO at 1 bar and 160 ml/min.

A single test cell (5 cm$^2$) was built up to perform electrochemical characterisations of the membrane-electrode assemblies. The test cell is in principle as illustrated in FIG. 10. Graphite plates with gas channels were used as the holder. Two aluminium end plates with attached heaters are used to clamp the graphite plates and collect current. Temperature is controlled by a controller. Fuel and oxidant gases were supplied by means of mass flow controllers. Performance curves were obtained by the current step potentiometry. Potential values at various current densities were then taken from chronopotentiometric curves when a steady state was reached.

Example 1

20 grams of 3 wt % PBI solution in dimethylacetamide were poured into a glass dish of 145 mm diameter. After drying in a ventilated oven at 85° C. for 30 hours, 100° C. for 10 hours, and then at 120° C. for 10 hours, the polymer membrane were washed with distilled water at 80° C. to remove the residual solvent and stabilising salts.

Figure 2:
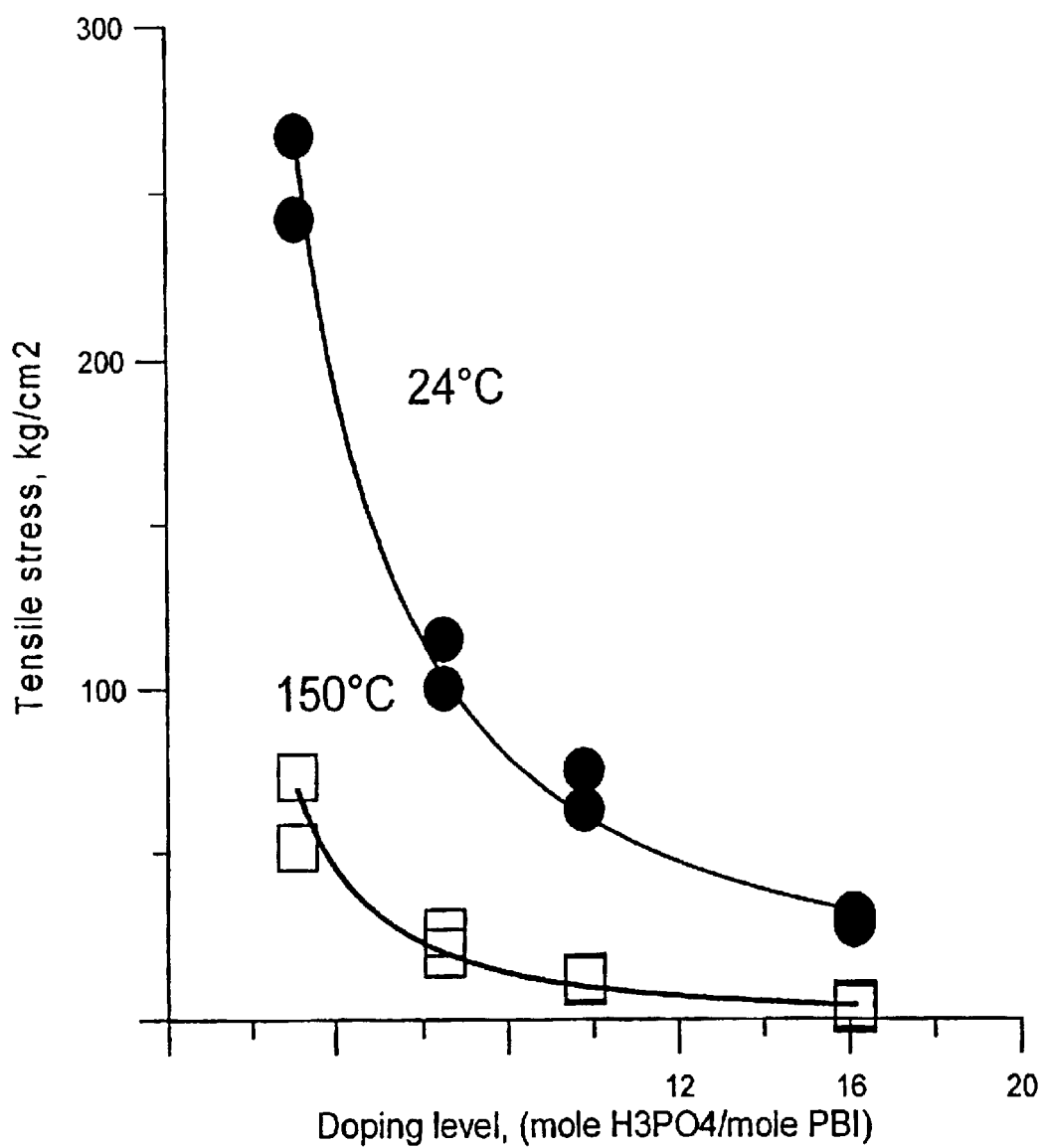
FIG. 2. Tensile stress of PBI membranes as a function of the doping level at different temperatures.

The membrane was thereafter immersed in phosphoric acid of concentration 50, 65, 75, and 90 wt %, respectively. After 15 days at room temperature, the membrane was doped at levels of 310, 650, 980, and 1610 mol %, accordingly. FIG. 1 shows the conductivity of the membrane as a function of the doping level at temperatures of 25 and 150° C., respectively. FIG. 2 shows the tensile stress of the membrane as a function of the doping level at temperatures of 25 and 150° C., respectively.

Example 2

Onto a wet-proofed carbon backing substrate (Toray paper TGP-H-120, Toray Ind. Inc.) a slurry of 60 wt % carbon powder (Vulcan XC-72, Cabot) and 40 wt % polytetrafluoro-ethylene (PTFE) was applied. The resulting layer was then dried and sintered at 370° C. for 20 minutes. This supporting layer is hydrophobic so that it allows access of reactive gases. As a bridge between the carbon paper backing and the catalyst layer this layer prevents also the electrode from serious cracking after drying and sintering.

A mixture of 40 wt % Pt/C catalyst powder and 60 wt % PBI from a 3 wt % polymer solution in dimethylacetamide was well mixed and applied on to the supporting layer of the carbon paper by tape-casting. The platinum loading in the catalyst layer is 0.45 mg/cm$^2$. After drying at 130° C. for 10 minutes, the electrode was impregnated with a mixed acid of 65 wt % phosphoric acid and 35 wt % trifluoroacetic acid. The amount of impregnated phosphoric acid is related to the PBI content in the catalyst layer of the electrode, in a molar ratio of 14 to 1.

Figure 3:
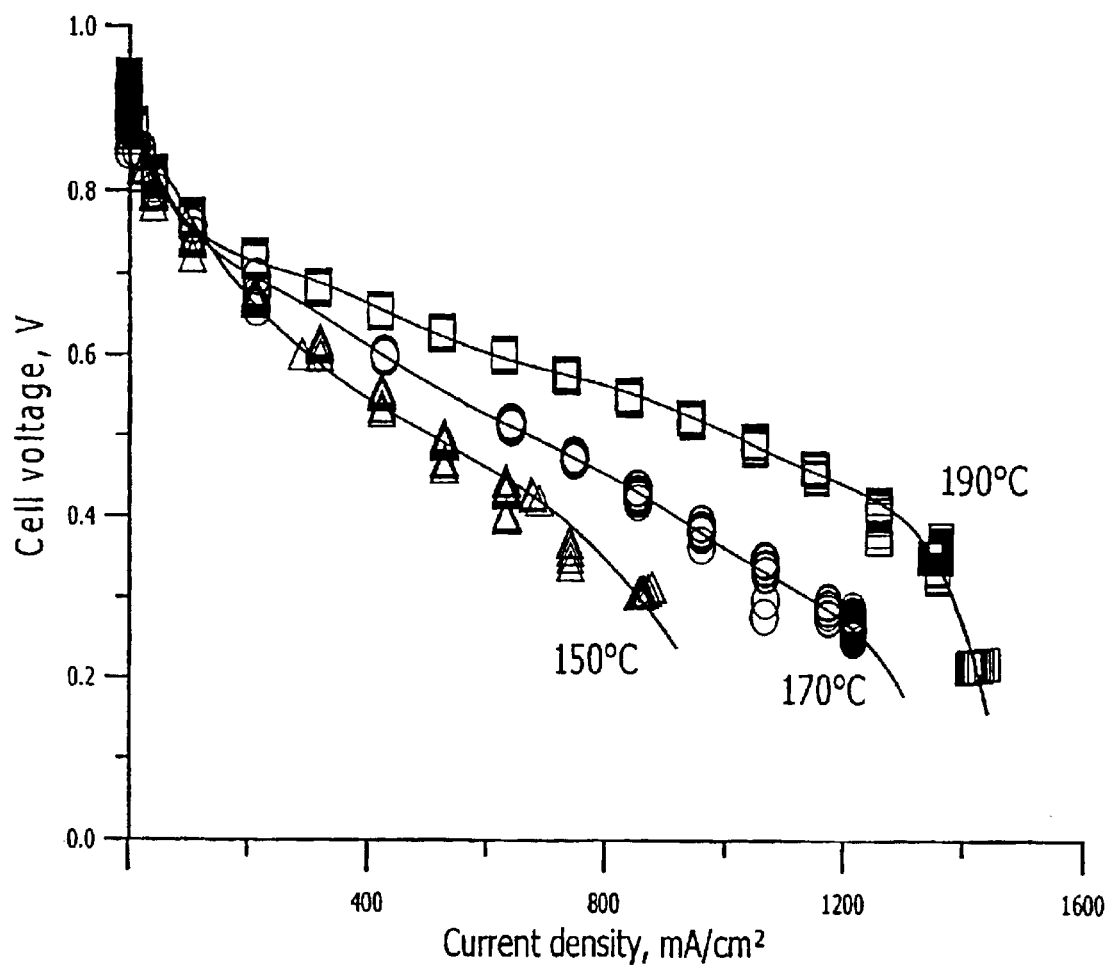
FIG. 3. Cell voltage versus current density curves of the high temperature polymer electrolyte membrane fuel cell at different temperatures. Electrodes with a platinum loading of 0.45 mg/$cm^2$; the PBI membrane at doping level of 6.5/1; oxygen at 1 atm and 200 ml/min; and hydrogen at 1 atm and 160 ml/min.
Figure 4:
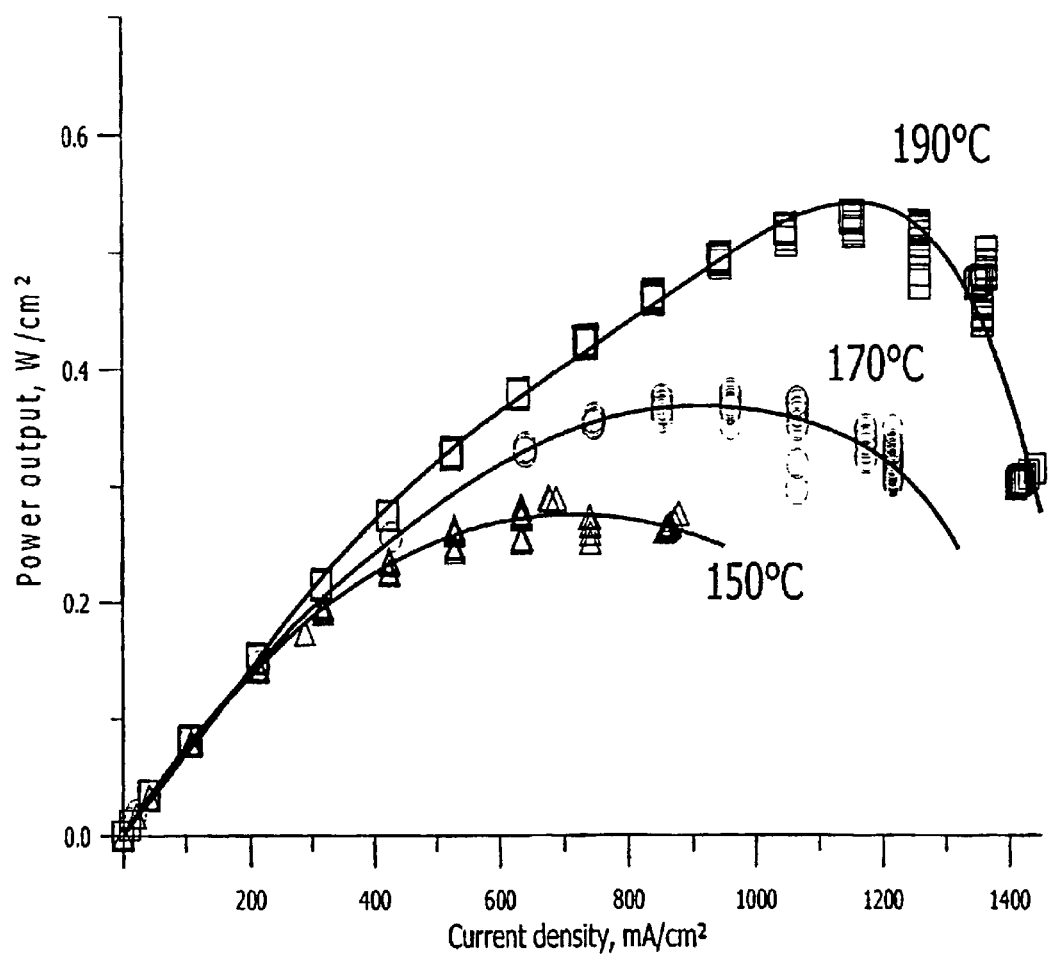
FIG. 4. Power output of the high temperature polymer electrolyte membrane fuel cell at different temperatures. Electrodes with a platinum loading of 0.45 mg/$cm^2$; the PBI membrane at doping level of 6.5/1; oxygen at 1 atm and 200 ml/min; and hydrogen at 1 atm and 160 ml/min. No humidification for either hydrogen or oxygen.

From the impregnated electrodes and acid-doped PBI membranes (doping level 650), a membrane-electrode assembly was made by means of hot-press at a temperature of 150° C., a pressure of 0.5 bar, and a duration of 12 minutes. The assembly was then placed in a test cell. Current density versus cell voltage curves at each test temperature were measured after the cell performance reached a steady state. Both hydrogen and oxygen were under atmospheric pressure. FIG. 3 shows the performance curves at temperatures 150, 170, and 190° C., respectively, FIG. 4 shows the power output of the test cell as a function of current density at temperatures 150, 170, and 190° C., respectivley.

Example 3

On to the wet-proofed carbon substrate (Toray paper TGP-H-120, Toray Ind. Inc.) a slurry of 60 wt % carbon powder (Vulcan XC-72, Cabot) and 40 wt % PTFE was applied and then dried and sintered at 370° C. for 20 minutes.

A mixture of 45 wt % PVC catalyst powder and 55 wt % PBI from a 2 wt % solution in dimethylacetamide was prepared and applied on to the supporting layer of the carbon substrate, as the cathode. A mixture of 45 wt % Pt—Ru/C catalyst powder and 55 wt % PBI from a 2 wt % solution in dimethylacetamide was prepared and applied on to the supporting layer of the carbon substrate, as the anode. The platinum loading in the catalyst layer of both electrodes was 0.45 mg/cm$^2$. After drying at 130° C. for 5 minutes, the electrode was impregnated with a mixed acid of 60 wt % phosphoric acid and 40 wt % trifluoroacetic acid. The amount of impregnated phosphoric acid was related to the PBI content in the catalyst layer of the electrode, being in a molar ratio of 12 to 1.

Figure 5:
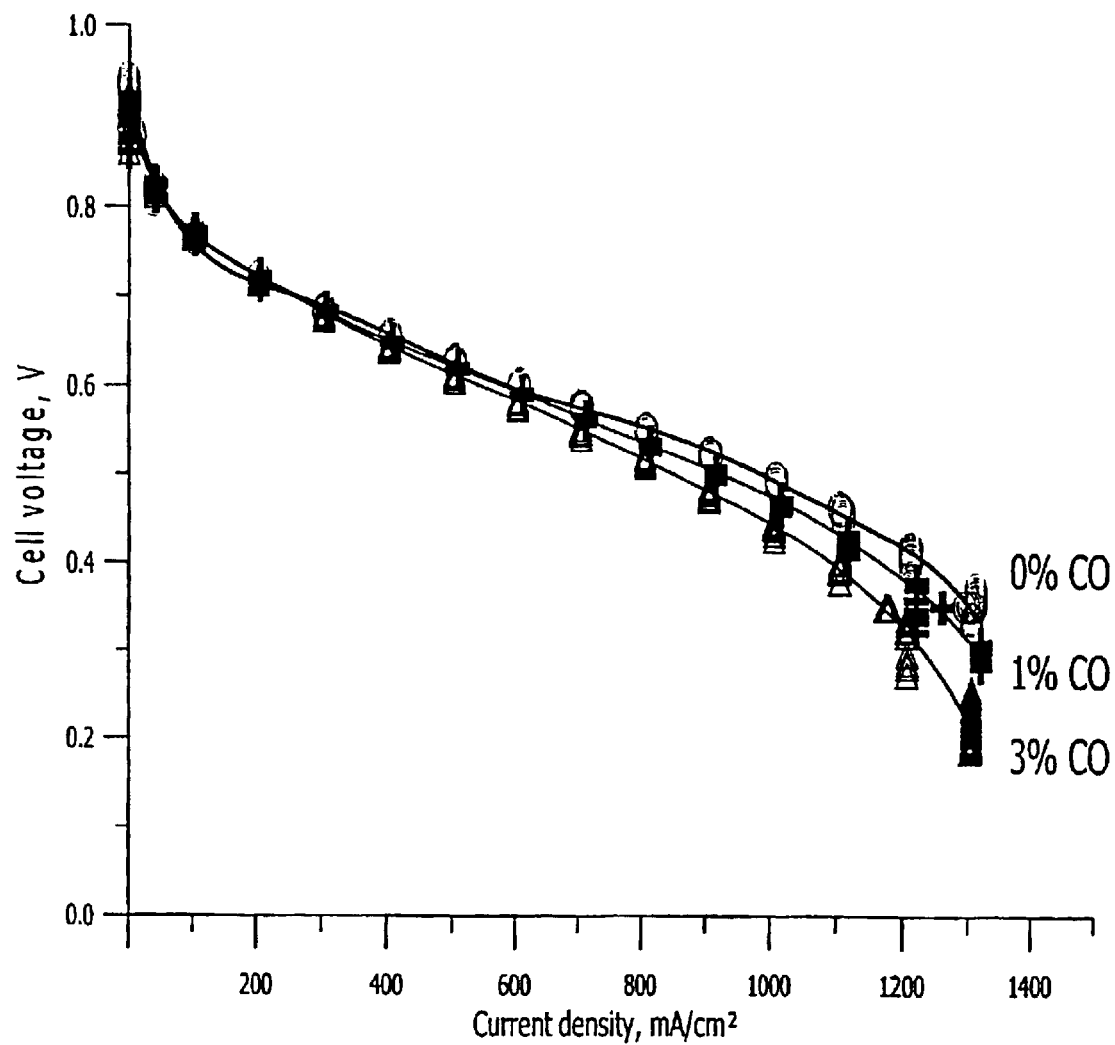
FIG. 5. Cell voltage versus current density curves of the high temperature polymer electrolyte membrane fuel cell at 190° C. Cathode with platinum catalyst of 0.45 mg/$cm^2$ and anode with platinum-ruthenium (atomic ratio 1:1) alloy catalyst of 0.45 mg/$cm^2$; the PBI membrane at doping level of 6.5/1; oxygen at 1 atm and 200 ml/min; and hydrogen containing 0 and 3 vol % CO at 1 atm and 160 ml/min. No humidification for oxygen but hydrogen containing CO is humidified by bubbling through a water bath at room temperature.

From the impregnated electrodes and acid-doped PBI membranes (doping level 650), a membrane-electrode assembly was made by means of hot-press at a temperature of 150° C., a pressure of 0.4 bar, and a duration of 15 minutes. The assembly was then placed in a test cell. Cell voltage versus current density curves at each measuring temperature were measured after the cell performance reached a steady state. Pure hydrogen and hydrogen containing 1 to 3 vol % CO were used as the fuel gas. Both hydrogen-containing fuel and oxygen are under atmospheric pressure. FIG. 5 shows the performance curves at 190° C. for hydrogen containing 0, 1, and 3 vol % carbon monoxide.

Example 4

3 wt % PBI solution in dimethylacetamide was mixed with 3 wt % sulfonated polysulfone in a weight ratio of 75 to 25. The polysulfone was sulfonated to a 44% degree by using chlorosulfonic acid as a sulfonated agent in a dichloroethane solution. After drying, the polymer membrane was washed with distilled water at 80° C. to remove the residual solvent and stabilising salts.

The membrane was thereafter immersed in phosphoric acid of concentration 80, 70, 60 and 50 wt %, respectively. After 8 days at room temperature, the membrane was doped at levels of 801, 550, 459, and 381 mol % $H_3PO_4$, accordingly. At 25° C. the ionic conductivity of the obtained blend membranes was found to be 0.054, 0.049, 0.031, and 0.020 S/cm, respectively.

Example 5

5 wt % PBI solution in dimethylacetamide was mixed with 5 wt % sulfonated polysuffone in a weight ratio of 50 to 50. The polysulfone was sulfonated to a 36% degree by using chlorosulfonic acid as a sulfonated agent in a dichloroethane solution. After drying, the polymer membrane was washed with distilled water at 80° C. to remove the residual solvent and stabilising salts.

The membrane was thereafter immersed in phosphoric acid of concentration 85, 75, and 65 wt %, respectively. After 10 days at room temperature, the membrane was doped at levels of 702, 467, and 381 mol % $H_3PO_4$, accordingly. At 25° C. the ionic conductivity of the membranes was found to be 0.056, 0.048, and 0.026 S/cm, respectively.

Example 6

10 wt % PBI solution in dimethylacetamide was mixed with 10 wt % polyetherimide in a weight ratio of 75 to 25. After drying, the polymer membrane was washed with distilled water at 80° C. to remove the residual solvent and stabilising salts.

The membrane was thereafter immersed in phosphoric acid of concentration 75 wt %. After 10 days at room temperature, the membrane was doped at a level of 660 mol % $H_3PO_4$. At 25° C. the ionic conductivity of the membranes was found to be 0.015 S/cm. The ionic conductivity of pure PBI membranes doped with about 660 mol % was 0.014 S/cm.

At a doping level of 660 mol % $H_3PO_4$, the tensile stress at 150° C. for pure PBI membranes was found to be 54 $kg/cm^2$, while that for 50–50 mol % PBI-SPSF blend membrane was found to be 87 $kg/cm^2$.

Example 7

The wet-proofed carbon backing substrate was coated with a carbon supporting layer (of 60 wt % carbon powder and 40 wt % polytetrafluoroethylene). This supporting layer is hydrophobic so that it allows access of reactive gases. As a bridge between the carbon paper backing and the catalyst layer this layer also prevents the electrode from serious cracking after drying and sintering.

The platinum chloroacid was first prepared by dissolution of metallic platinum in a mixture of concentrated nitric acid and hydrochloride acid. The platinum chloroacid was then mixed with carbon powder (Vulcan XC-72, Cabot). With help of surface active agents the noble metal was chemically reduced on the surface of the carbon powder at 95° C. The obtained carbon-supported platinum catalyst (20 wt % Pt) was then filtered, washed with distilled water, dried, and finally ground into a fine powder.

A mixed polymer solution of PBI and SPSF with a weight ratio of 50 to 50 was used as binder for the catalyst layer. A slurry of 40 wt % Pt/C catalyst powder and 60 wt % mixed polymer solution was well mixed and applied on to the supporting layer of the carbon paper by tape-casting. The platinum loading in the catalyst layer was 0.45 $mg/cm^2$. After drying the electrode was impregnated with a mixed acid of 65 wt % phosphoric acid and 35 wt % trifluoroacetic acid.

An acid-doped blend polymer membrane of 50% PBI and 50% SPSF (sulfonation degree 36%) was used as the electrolyte. From the impregnated electrodes and acid-doped PBI membranes, a membrane-electrode assembly was made by hot-press. The assembly was then placed in a test cell. At 190° C. with hydrogen and oxygen, a cell performance of current density 0.89 $A/cm^2$ at cell voltage of 0.5 V was obtained.

Example 8

The wet-proofed carbon backing substrate was coated with a carbon supporting layer (of 60 wt % carbon powder and 40 wt % polytetrafluoroethylene). This supporting layer is hydrophobic so that it allows access of reactive gases. As a bridge between the carbon paper backing and the catalyst layer this layer also prevents the electrode from serious cracking after drying and sintering.

The platinum chloroacid was first prepared by dissolution of metallic platinum in a mixture of concentrated nitric acid and hydrochloride acid. The platinum chloroacid was then mixed with carbon powder (Vulcan XC-72, Cabot). With help of surface active agents the noble metal was chemically reduced on the surface of the carbon powder at 95° C. The obtained carbon-supported platinum catalyst (20 wt % Pt) was then filtered, washed with distilled water, dried, and finally ground into a fine powder. 4.5 wt % SPSF solution in dimethylacetamide was used as binder for the catalyst layer. A slurry of 45 wt % Pt/C catalyst powder and 55 wt % polymer solution was mixed well and applied on to the supporting layer of the carbon paper by tape-casting. The platinum loading in the catalyst layer is 0.45 $mg/cm^2$. After drying, the electrode was impregnated with a mixed acid of 70 wt % phosphoric acid and 30 wt % trifluoroacetic acid.

An acid-doped blend polymer membrane of 75% PSI and 25% SPSF (sulfonation degree 44%) was used as the electrolyte. From the impregnated electrodes and acid-doped blend membrane, a membrane-electrode assembly was made by means of hot-press. The assembly was then placed in a test cell. At 190° C. with hydrogen and oxygen, a cell performance of current density 0.88 $A/cm^2$ at cell voltage of 0.5 V was observed. When hydrogen containing 3 vol % CO was used as the fuel gas and oxygen as the oxidant, a current density of 0.75 $A/cm^2$ at cell voltage of 0.5 V was observed.

Example 9

As shown in FIG. 7, the PBI/SPSF blend polymer membranes exhibit much higher conductivity than pure PBI membranes. At a doping level of 600 mol % $H_3PO_4$, for example, the conductivity of pure PBI membranes is around 0.014 S/cm at temperature of 25° C. and relative humidity of 80%, while that of 50-50 mol % PBI-SPSF blend polymer membranes is about 0.052 S/cm. The functional groups in the sulfonated PSF apparently takes part in the ionic conduction and therefore a high conductivity of blend polymer membranes is therefore expected.

For PBI/PEI blend membranes, the conductivity as a function of doping level is found to be very close to that pure PBI. As an example, a 75%PBI-25%PEI blend membrane doped at a level of 660 mol % $H_3PO_4$, exhibits a conductivity from 0.013 to 0.017 S/cm.

Example 10

For pure PEI membranes, high doping levels result in a reduction in the mechanical strength, especially at high temperatures. A proper doping level in a low range is consequently preferred, corresponding to a low electric conductivity. For the PBI-SPSF blend solid electrolytes, the mechanical strength was measured at both 25 and 150° C. FIG. 8 shows the results as a function of the membrane doping level at room temperatures. No improvement was observed for blend polymer solid electrolytes. At 150° C., however, as shown in FIG. 9, the mechanical properties of membranes were much improved for blend polymer electrolytes. At a doping level about 600–660 mol % $H_3PO_4$, for example, the tensile stress for pure PBI membranes is 42–61 $kg/cm^2$, while that for 50-50 mol % PBI-SPSF blends is as high as 75–92 $kg/cm^2$.

For pure PEI membrane, the tensile stress is found to be as high as 563–613 $kg/cm^2$ at 25° C. and 413–438 $kg/cm^2$ at 150° C. A 75%PBI-25%PEI blend membrane doped at a level of 600–660 mol % $H_3PO_4$ exhibits a tensile stress of 201–220 $kg/cm^2$ at 25° C. and 88–113 $kg/cm^2$ at 150° C., compared to a pure PBI membrane doped with 600–660 mol % $H_3PO_4$ having a tensile stress of only 128–147 $kg/cm^2$ at 25° C. and 42–61 $kg/cm^2$ at 150° C.

Example 11

The wet-proofed carbon backing substrate was coated with a carbon supporting layer (of 60 wt % carbon powder and 40 wt % polytetrafluoroethylene). This supporting layer is hydrophobic so that it allows access of reactive gases. As a bridge between the carbon paper backing and the catalyst layer this layer also prevents the electrode from serious cracking after drying and sintering.

The platinum chloroacid was first prepared by dissolution of metallic platinum in a mixture of concentrated nitric acid and hydrochloride acid. The platinum chloroacid was then mixed with carbon powder (Vulcan XC-72, Cabot). With help of surface active agents the noble metal was chemically reduced on the surface of the carbon powder at 95° C. The obtained carbon-supported platinum catalyst (20 wt % Pt) was then filtered, washed with distilled water, dried, and finally ground into a fine powder.

4.5 wt % SPSF solution in dimethylacetamide was used as binder for the catalyst layer. A slurry of 45 wt % Pt/C catalyst powder and 55 wt % polymer solution was mixed well and applied on to the supporting layer of the carbon paper by tape-casting. The platinum loading in the catalyst layer is 0.45 $mg/cm^2$. After drying, the electrode was impregnated with a mixed acid of 70 wt % phosphoric acid and 30 wt % trifluoroacetic acid.

Figure 11:
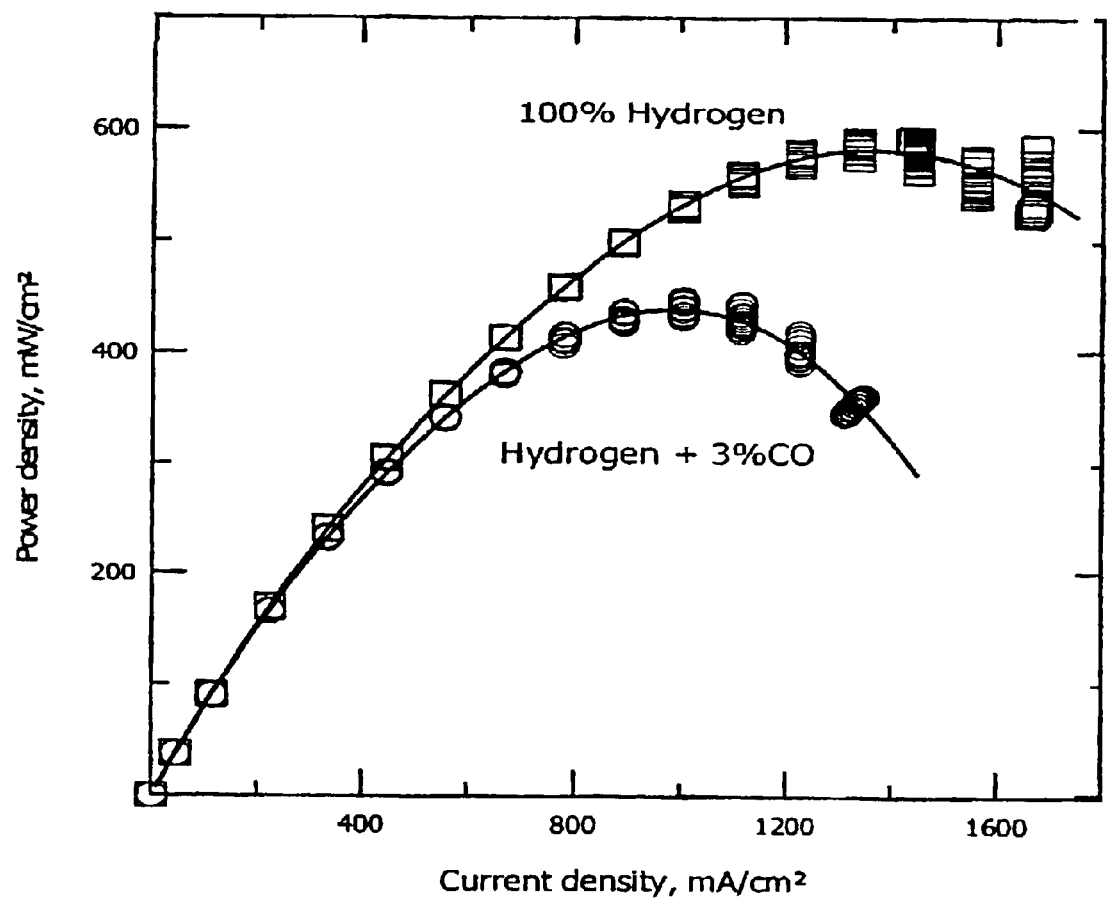
FIG. 11. Cell power density versus current density curves at 190° C. Electrodes with a platinum loading of 0.45 mg/cm$^2$; the PBI/SPSF membrane at doping level of 4.5/1; oxygen at 1 bar and 200 ml/min; hydrogen and hydrogen containing 3% CO at 1 bar and 160 ml/min.

An acid-doped blend polymer membrane of 75% PBI and 25% SPSF (sulfonation degree 44%) was used as the electrolyte. From the impregnated electrodes and acid-doped blend membrane, a membrane-electrode assembly was made by means of hot-press. The assembly was then placed in a test cell. The performance is shown in FIGS. 10 and 11. At 190° C. with hydrogen and oxygen, a cell performance of current density 0.80 $A/cm^2$ at cell voltage of 0.6 V was observed. When hydrogen containing 3 vol % CO was used as the fuel gas and oxygen as the oxidant, a current density of 0.6 $A/cm^2$ at cell voltage of 0.6 V as observed.

Although this invention has been shown and described with respect to detailed embodiments hereof, it will be understood by those skilled in the art that many variations and modifications in form and detail thereof may be made without departing from the spirit and scope of the claimed invention.

What is claimed is:

1. A method for preparation of a polymer electrolyte membrane (PEM) for fuel cells, the method comprising the following steps:
   providing an acid-doped solid electrolyte;
   providing a gas diffusion cathode by:
   i) providing a first hydrophobic carbon support substrate by treatment of a carbon substrate with a hydrophobic polymer solution,
   ii) providing a first supporting layer on the first support substrate by casting a slurry onto the first support substrate, said slurry comprising carbon black, and a hydrophobic polymer,
   iii) providing a first catalyst layer on the first supporting layer by casting a slurry onto the first supporting layer, said slurry comprising carbon-supported noble metal catalysts and a polymer binder, and
   iv) doping the first catalyst layer with an acid mixture comprising a volatile acid and a non-volatile acid;
   providing a gas diffusion anode by essentially utilizing the steps i)–iv) above, said gas diffusion anode comprising a second hydrophobic carbon support substrate, and a second supporting layer and a second catalyst layer; and
   assembling the polymer electrolyte membrane (PEM) by sandwiching the gas diffusion anode, the solid electrolyte and the gas diffusion cathode so that the first catalyst layer and the second catalyst layer both are facing the solid electrolyte.

2. The method of according to claim 1, wherein the solid electrolyte essentially consist of a polybenzimidazole or a polymer blend comprising a polybenzimidazole and a thermoplastic polymer.

3. The method according to claim 1, wherein the solid electrolyte at least 98 wt. % consists of a polybenzimidazole or a polymer blend comprising a polybenzimidazole and a thermoplastic polymer.

4. The method according to claim 2, wherein the solid electrolyte essentially consist of a polymer blend comprising a polybenzimidazole and a thermoplastic polymer.

5. The method according to claim 2, wherein the solid electrolyte is doped with sulfuric acid or phosphoric acid, said acid having a concentration of 40–90 wt %.

6. The method according to claim 5, wherein the doping level, defined as the mole percentage of the doping acid per repeat unit of the polymer, is 250–800 where the solid electrolyte essentially consist of a polybenzimidazole, and wherein the doping level is 200–750 where the solid electrolyte essentially consists of a polymer blend.

7. The method according to claim 5, wherein the doping level, defined as the mole percentage of the doping acid per repeat unit of the polymer, is 250–800 where the solid electrolyte at least 98 wt. % consists of a polybenzimidazole, and wherein the doping level is 200–750 where the solid electrolyte essentially consists of a polymer blend.

8. The method according to claim 1, wherein the first supporting layer consist of 40–60 wt % carbon black and 60–40 wt % hydrophobic polymer.

9. The method according to claim 1, wherein the first supporting layer is formed by tape-casting and subsequently dried and sintered.

10. The method according to claim 1, wherein the catalyst layer essentially consists of 30–55 wt % catalyst-powder, preferably comprising a platinum catalyst for the cathode and a platinum-ruthenium catalyst for the anode, and 70–45 wt % polymer comprising a polybenzimidazole and a thermoplastic polymer.

11. The method according to claim 10, wherein the catalyst layer is formed by slurry casting and subsequently dried and sintered.

12. The method according to claim 10, wherein the polymer comprises a polybenzimidazole.

13. The method according to claim 10, wherein the polymer comprises a blend of a polybenzimidazole and a thermoplastic polymer.

14. The method according to claim 1, wherein said acid mixture comprises 30–70 wt % phosphoric acid or sulfuric acid and 30–70 wt % trifluoroacetic acid or acetic acid.

15. The method according to claim 14, wherein phosphoric acid is used in a concentration of 2–30 wt. %, and the molar ratio of the phosphoric acid to the polymer contained in the catalyst layer is 5–20.

16. The method according to claim 1, wherein the gas diffusion anode is prepared essentially as defined for the gas diffusion cathode, said second catalyst layer preferably comprising a platinum-ruthenium alloy.

17. The method according to claim 1, wherein the assembling performed by a hot-press.

18. The method according to claim 17, wherein the hot-press is at a temperature of 80–200° C. and a pressure of 0.1–1.5 bar.

19. The method according to claim 2, wherein the polymer blend comprises polybenzimidazoles and one or more thermoplastic resins doped with acid.

20. The method according to claim 19, wherein the polybenzimidazole is poly (2,2'-m-(phenylene)-5,5'-bibenzimidazole, the solid electrolyte comprising 10–75 mol %, of the polybenzimidazole.

21. The method according to claim 19, wherein said thermoplastic resin is an ionomer prepared by sulfonation of a polysulfone, with a sulfonation degree of 5–80%.

22. A polymer electrolyte membrane (PEM) for use in fuel cells, said membrane comprising the following successive layers:
  i) a first hydrophobic carbon support substrate including a hydrophobic polymer;
  ii) a first supporting layer comprising carbon black and a hydrophobic polymer;
  iii) a first catalyst layer comprising a carbon-supported noble metal catalyst and a polymer or polymer blend as binder, said first catalyst layer being doped with an acid mixture comprising a volatile acid and a non-volatile acid;
  iv) an acid-doped solid electrolyte
  v) a second catalyst layer comprising a carbon-supported noble metal catalyst and a polymer or polymer blend as binder, said second catalyst layer being doped with an acid mixture comprising a volatile acid and a non-volatile acid;
  vi) a second supporting layer comprising carbon black and a hydrophobic polymer; and
  vii) a second hydrophobic carbon support substrate including a hydrophobic polymer.

23. The polymer electrolyte membrane according to claim 22, wherein the first catalyst layer and the second catalyst layer are not identical.

24. The polymer electrolyte membrane according to claim 22, obtainable by the method according to claim 1.

25. The polymer electrolyte membrane fuel cell comprising a polymer electrolyte membrane (PEM) according to claim 22, which comprises a first hydrophobic carbon support substrate, a first supporting layer, a first catalyst layer, an acid doped solid electrolyte, a second catalyst layer, a second supporting layer, and a second hydrophobic carbon support substrate; said first and second carbon support substrates being in contact with current collection plates and, respectively, with gas flow channels are both oxidant gas and fuel gas supply.

26. The fuel cell according to claim 25, wherein the polymer electrolyte membrane is as defined in claim 23.

27. A method for operating a polymer electrolyte membrane fuel cell capable of operating without removal of carbon monoxide from a fuel gas before said fuel gas is being fed to the fuel cell, said fuel gas comprising a constant or intermittent carbon monoxide content of at least 0.5 vol %, said method comprising the steps of:
  i) providing the fuel cell comprising a gas diffusion cathode for reducing an oxygen-containing oxidant gas, a gas diffusion anode for oxidizing a hydrogen-rich fuel gas, and a solid electrolyte, said solid electrolyte consisting of an acid-doped membrane comprising polybenzimidazole, wherein the acid comprising a mixture of a volatile acid and a non-volatile acid,
  ii) feeding an oxidant gas to the cathode of the fuel cell, and
  iii) feeding a fuel gas, preferably a hydrogen-rich gas, to the anode of the fuel cell,
wherein the temperature of the fuel cell being 25–250° C.

28. The method according to claim 27, wherein the carbon monoxide content of the fuel gas constantly or intermittently is at least 1.0 vol %.

29. The method according to claim 27, wherein the oxygen-containing gas is not humidified.

30. The method according to claim 27, wherein the hydrogen-rich gas is humidified at room temperature.

31. A solid electrolyte for polymer electrolyte membrane fuel cells, said solid electrolyte comprising a blend of a polybenzimidazole and one or more other thermoplastic resins doped with acid.

32. The electrolyte according to claim 31, wherein the polybenzimidazole is poly(2,2'-m-(phenylene)-5,5'-bibenzimidazole (PBI).

33. The electrolyte according to claim 31, wherein the electrolyte comprises 10–75 mol %, of the polybenzimidazole.

34. The electrolyte according to claim 31, wherein the thermoplastic polymer is selected from polyimides (PI), polyamides (PA), polyamideimide (PAI), polyetherimides (PEI), polyarylate (PAr), poly(4-vinyl pyridine) (PVPy), and sulfonated polysulfones (SPSF).

35. The electrolyte according to claim 34, wherein said thermoplastic polymer is an ionomer prepared by sulfonation of a polysulfone with a sulfonation degree of 5–80%.

36. The electrolyte according to claim 31, wherein the acid with which the electrolyte is doped is an acid selected from phosphoric acid or sulfuric acid, said acid having a concentration of 40–90 wt %.

* * * * *